United States Patent
Klabunde et al.

(10) Patent No.: US 10,471,518 B2
(45) Date of Patent: Nov. 12, 2019

(54) MACHINE TOOL WITH TOOL-ACCOMMODATING DEVICE

(71) Applicants: C. & E. FEIN GMBH, Schwäbisch Gmünd-Bargau (DE); ROBERT BOSCH GMBH, Stuttgart (DE)

(72) Inventors: Olaf Klabunde, Giengen/Brenz (DE); Juergen Blickle, Goeppingen (DE); Walter Thomaschewski, Filderstadt (DE); Fabian Bek, Boebingen (DE); Stefano Delfini, Bettlach (CH); Willi Fellmann, Solothurn (CH); Bruno Luescher, Zolfingen (CH); Milan Bozic, Solothurn (CH); Thomas Mathys, Lyss (CH); Daniel Grolimund, Zuchwil (CH)

(73) Assignees: C. & E. FEIN GMBH, Schwaebisch Gmuend-Bargau (DE); ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/909,247

(22) PCT Filed: Jul. 25, 2014

(86) PCT No.: PCT/EP2014/002050
§ 371 (c)(1),
(2) Date: Feb. 1, 2016

(87) PCT Pub. No.: WO2015/014469
PCT Pub. Date: Feb. 5, 2015

(65) Prior Publication Data
US 2016/0184956 A1    Jun. 30, 2016

(30) Foreign Application Priority Data
Aug. 1, 2013  (DE) .................. 20 2013 006 901 U

(51) Int. Cl.
*B23B 31/103* (2006.01)
*B23B 31/18* (2006.01)
(Continued)

(52) U.S. Cl.
CPC ............ *B23B 31/103* (2013.01); *B23B 31/18* (2013.01); *B24B 23/022* (2013.01); *B24B 23/04* (2013.01);
(Continued)

(58) Field of Classification Search
CPC ....... B23B 31/10; B23B 31/103; B23B 31/18; B27B 19/006; B27B 5/30; B27B 5/32;
(Continued)

(56) References Cited

U.S. PATENT DOCUMENTS 10,924 A * 5/1854 Daboli ................. B23B 31/103
                                                                279/77
32,890 A * 7/1861 Pollard ................ B23B 31/103
                                                                279/77
(Continued)

FOREIGN PATENT DOCUMENTS

CN        1357431         7/2002
CN      101066577        11/2007
(Continued)

OTHER PUBLICATIONS

U.S. Appl. No. 14/909,204, filed Feb. 1, 2016, Klabunde et al.
(Continued)

*Primary Examiner* — Eric A. Gates
*Assistant Examiner* — Chwen-Wei Su
(74) *Attorney, Agent, or Firm* — Sheridan Ross P.C.

(57) ABSTRACT

The invention relates to a machine tool, in particular a hand held machine tool, which has a tool-accommodating device which can be moved, in particular in oscillating fashion, about a drive axis, in order to retain a tool device on the
(Continued)

machine tool. The tool-accommodating device has at least one clamping device, at least one retaining device and at least one locking device. The retaining device can be moved from at least one first, open position into at least one second, closed position. It is also the case that the retaining device can be forced by a clamping force, by way of the clamping device, preferably in the closing direction from said first, open position in the direction of said second, closed position. The locking device can be moved between at least one first, locking position and at least one second, unlocking position. It is possible here for said locking device to block movement of the retaining device in at least one locking position. A force applied to the locking device directly or indirectly by the tool device moves said locking device from one of said locking positions into one of said unlocking positions. This allows the tool device to be inserted particularly quickly and straightforwardly into the machine tool.

33 Claims, 19 Drawing Sheets

(51) Int. Cl.
- *B24B 23/02* (2006.01)
- *B24B 45/00* (2006.01)
- *B27B 19/00* (2006.01)
- *B24B 23/04* (2006.01)
- *B23B 31/10* (2006.01)

(52) U.S. Cl.
CPC .......... *B24B 45/006* (2013.01); *B27B 19/006* (2013.01); *B23B 31/10* (2013.01); Y10T 279/1071 (2015.01); Y10T 279/1095 (2015.01); Y10T 279/18 (2015.01); Y10T 279/33 (2015.01)

(58) Field of Classification Search
CPC ..... B24B 23/02; B24B 23/022; B23D 61/006; Y10T 279/33; Y10T 279/1071; Y10T 279/1095; Y10T 279/18; Y10S 279/906
See application file for complete search history.

(56) References Cited

U.S. PATENT DOCUMENTS

| | | | |
|---|---|---|---|
| 78,652 A * | 6/1868 | Criag | B23B 31/103 279/77 |
| 3,233,908 A * | 2/1966 | Tietze | B23B 31/18 269/47 |
| 3,622,170 A * | 11/1971 | Sedgwick | B23B 31/103 279/109 |
| 3,667,169 A | 6/1972 | MacKay, Jr. | |
| 3,667,170 A | 6/1972 | MacKay, Jr. | |
| 3,998,467 A * | 12/1976 | Petkovich | B23B 31/18 279/107 |
| 4,205,572 A | 6/1980 | Weiner | |
| 4,747,607 A | 5/1988 | Emter | |
| 5,031,361 A | 7/1991 | MacKay, Jr. | |
| 5,143,495 A | 9/1992 | Bosek | |
| 5,157,873 A | 10/1992 | Rudolf et al. | |
| 5,468,176 A | 11/1995 | Udert et al. | |
| 6,142,858 A | 11/2000 | Luedeke | |
| 6,623,202 B2 | 9/2003 | Hansson et al. | |
| 6,796,888 B2 | 9/2004 | Jasch | |
| 6,887,142 B2 | 5/2005 | Rupprecht et al. | |
| 7,997,586 B2 | 8/2011 | Ziegler et al. | |
| 8,042,437 B2 | 10/2011 | Maier et al. | |
| 8,113,520 B2 | 2/2012 | Zaiser et al. | |
| 9,108,255 B2 * | 8/2015 | Li | B23C 5/26 |
| 9,120,216 B2 | 9/2015 | Zhang et al. | |
| 9,174,354 B2 | 11/2015 | Zhou | |
| 9,555,554 B2 | 1/2017 | Thorson et al. | |
| 9,737,969 B2 | 8/2017 | Bek et al. | |
| 10,124,461 B2 | 11/2018 | Kuehne et al. | |
| 2005/0095966 A1 | 5/2005 | Jasch et al. | |
| 2010/0056029 A1 | 3/2010 | Grunikiewicz | |
| 2011/0086582 A1 | 4/2011 | Takemura et al. | |
| 2011/0316242 A1 | 12/2011 | Zhang et al. | |
| 2012/0169018 A1 | 7/2012 | Lu et al. | |
| 2012/0170976 A1 | 7/2012 | Cai | |
| 2014/0290072 A1 | 10/2014 | Brown et al. | |
| 2017/0057050 A1 | 3/2017 | Montplaisir et al. | |

FOREIGN PATENT DOCUMENTS

| | | | | |
|---|---|---|---|---|
| CN | 100534708 | | 9/2009 | |
| CN | 101837579 | | 9/2010 | |
| CN | 102294682 | | 12/2011 | |
| CN | 202114710 | | 1/2012 | |
| CN | 102950586 | | 3/2013 | |
| DE | 2120669 | | 1/1972 | |
| DE | 3100096 | | 8/1982 | |
| DE | 29605728 | | 9/1996 | |
| DE | 10030586 | | 1/2002 | |
| DE | 102005031802 | A1 * | 1/2007 | ........... B23B 31/103 |
| DE | 102005047402 | | 4/2007 | |
| DE | 202011050511 | | 11/2011 | |
| DE | 102010046629 | | 3/2012 | |
| DE | 10 2011 00581 | A1 | 9/2012 | |
| DE | 102011005021 | A1 * | 9/2012 | ............... B27B 5/32 |
| DE | 102011005818 | | 9/2012 | |
| DE | 10 2011 08556 | A1 | 12/2012 | |
| DE | 102011085561 | | 12/2012 | |
| EP | 0577579 | | 1/1994 | |
| EP | 0596831 | | 5/1994 | |
| EP | 1302286 | | 4/2003 | |
| EP | 1852218 | | 11/2007 | |
| EP | 2623262 | | 11/2018 | |
| JP | S52-069085 | | 5/1977 | |
| JP | 54-054988 | | 4/1979 | |
| JP | S58-055845 | | 4/1983 | |
| JP | S63-278735 | | 11/1988 | |
| JP | H02-082435 | | 6/1990 | |
| JP | H06-190730 | | 7/1994 | |
| JP | 3021990 | | 12/1995 | |
| JP | 2002-233972 | | 8/2002 | |
| JP | 2003-533358 | | 11/2003 | |
| JP | 2011-245603 | | 12/2011 | |
| JP | 2013-094905 | | 5/2013 | |
| RU | 2179106 | | 2/2002 | |
| SU | 812542 | | 3/1981 | |
| WO | WO 96/23627 | | 8/1996 | |
| WO | WO 2005/049275 | | 6/2005 | |
| WO | WO 2005/102605 | | 11/2005 | |
| WO | WO 2012/007203 | | 1/2012 | |
| WO | WO 2012/150066 | | 11/2012 | |
| WO | WO 2013/044844 | | 4/2013 | |

OTHER PUBLICATIONS

U.S. Appl. No. 14/909,233, filed Feb. 1, 2016, Klabunde et al.
International Search Report for International (PCT) Patent Application No. PCT/EP2014/002048, dated Nov. 19, 2014, 5 pages (with English translation).
Written Opinion for International (PCT) Patent Application No. PCT/EP2014/002048, dated Nov. 19, 2014, 14 pages (with English translation).
International Preliminary Report on Patentability for International (PCT) Patent Application No. PCT/EP2014/002048, dated Feb. 2, 2016, 16 pages (with English translation).
International Search Report for International (PCT) Patent Application No. PCT/EP2014/002049, dated Oct. 27, 2014, 6 pages (with English translation).
Written Opinion for International (PCT) Patent Application No. PCT/EP2014/002049, dated Oct. 27, 2014, 12 pages (with English translation).
International Preliminary Report on Patentability for International (PCT) Patent Application No. PCT/EP2014/002049, dated Feb. 2, 2016, 14 pages (with English translation).

(56) References Cited

OTHER PUBLICATIONS

International Search Report for International (PCT) Patent Application No. PCT/EP2014/002050, dated Feb. 10, 2014, 5 pages (with English translation).
Written Opinion for International (PCT) Patent Application No. PCT/EP2014/002050, dated Feb. 10, 2014, 13 pages (with English translation).
International Preliminary Report on Patentability for International (PCT) Patent Application No. PCT/EP2014/002050, dated Feb. 2, 2016, 15 pages (with English translation).
Official Action for U.S. Appl. No. 14/909,204, dated Jul. 31, 2017 8 pages Restriction Requirement.
Official Action for U.S. Appl. No. 14/909,233, dated Aug. 10, 2017 17 pages.
International Search Report and Written Opinion prepared by the European Patent Office dated Sep. 25, 2014, for International Application No. PCT/EP2014/002050.
Official Action (with English Translation) for CN Patent Application No. 201480043578.3, dated Feb. 24, 2017, 20 pages.
Official Action with English Translation for China Patent Application No. 2014800435548, dated May 2, 2017, 13 pages.
Official Action for China Patent Application No. 201480043616.5, dated May 4, 2017, 16 pages.
Official Action for Australia Patent Application No. 2014298902, dated May 25, 2017, 4 pages.
Official Action for Australia Patent Application No. 2014298903, dated May 25, 2017, 3 pages.
Official Action with machine translation for European Patent Application No. 14745083.7, dated Mar. 1, 2017, 8 pages.
Examination Report for EP Patent Application No. 14747835.8, dated Feb. 17, 2017, 7 pages (no translation).
Search and Examination Report (with English machine translation) for Russian Patent Application No. 2016107074, dated Oct. 20, 2017, 22 pages.
Official Action for Australia Patent Application No. 2014298903, dated Dec. 8, 2017, 6 pages.
Official Action for U.S. Appl. No. 14/909,204, dated Dec. 14, 2017 16 pages.
Official Action for Austalia Patent Application No. 2014298902, dated Feb. 13, 2018, 5 pages.
Official Action for Australia Patent Application No. 2014298903, dated Feb. 13, 2018, 3 pages.
Official Action and Search Report with machine translation for Russia Patent Application No. 2016107071/02 dated Apr. 24, 2018, 11 pages.
Notice of Allowance for U.S. Appl. No. 14/909,204, dated Apr. 27, 2018 8 pages.
Notice of Allowance for U.S. Appl. No. 14/909,233, dated Mar. 27, 2018 9 pages.
Official Action and Search Report with machine translation for Russia Patent Application No. 2016107066/02, dated Apr. 26, 2018, 9 pages.
Official Action with machine translation for Japan Patent Application No. 2016-530375, dated Aug. 21, 2018, 11 pages.
Official Action with English Translation for Japan Patent Application No. 2016-530376, dated Jul. 3, 2018, 9 pages.
Official Action with machine Translation for China Patent Application No. 201480043554.8, dated Jul. 30, 2018, 19 pages.
Official Action with machine Translation for Japan Patent Application No. 2016-530377, dated Aug. 7, 2018, 9 pages.
Official Action for U.S. Appl. No. 16/030,678, dated Apr. 26, 2019 5 pages.
Official Action with machine translation for Japan Patent Application No. 2016-530376, dated May 28, 2019, 10 pages.
Official Action for U.S. Appl. No. 16/028,860, dated Jun. 3, 2019 13 pages.
Official Action with machine translation for Japan Patent Application No. 2016-530377, dated Jun. 4, 2019, 6 pages.

* cited by examiner

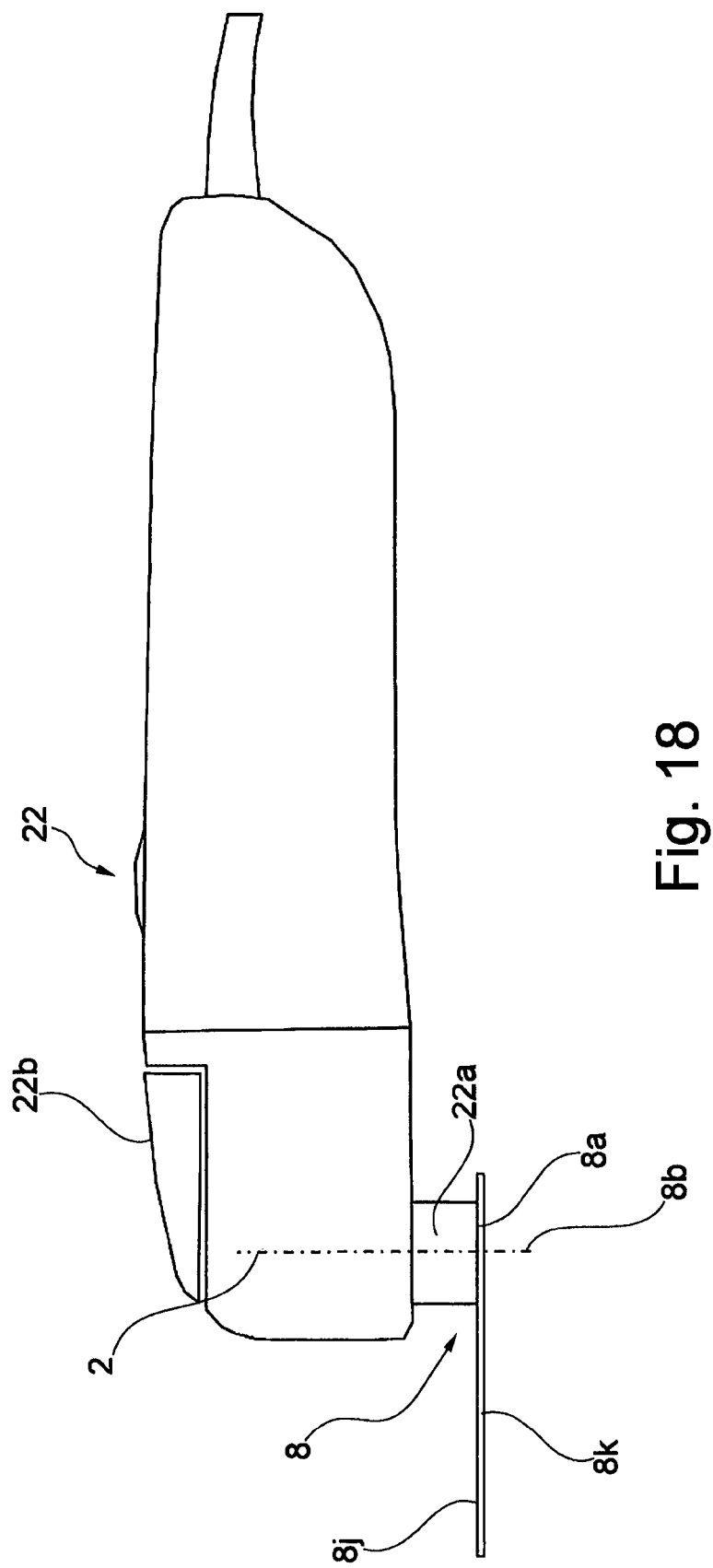

MACHINE TOOL WITH TOOL-ACCOMMODATING DEVICE

CROSS REFERENCE TO RELATED APPLICATIONS

This application is a national stage application under 35 U.S.C. 371 and claims the benefit of PCI Application No. PCT/EP2014/002050 having an international filing date of 25 Jul. 2014, which designated the United States, which PCT application claimed the benefit of German Patent Application No. 20 2013 006 901.5 filed 1 Aug. 2013, the entire disclosures of each of which are incorporated by reference herein.

The entire content of the priority application DE 20 2013 006 901.1 is incorporated by reference into the present application.

The present invention relates to a machine tool, and in particular with a hand guided machine tool having a driving device moving around a driving axis.

The invention will be described below mainly using the example of a hand guided machine tool, which is intended to be used with a tool device for the machining of a work piece or a work piece arrangement. In this case, the machine tool has in particular a driving device rotating oscillating or continuously rotating around a driving axis. This limitation of the illustration is not intended to limit the possible uses of such a tool device.

A machine tool is a device having one or more drive motors and optionally one or more transmission devices. The drive device of a machine tool is the component or the components with which the torque is applied to the tool, i.e. typically a driving shaft, a driving spindle or the like.

A hand guided machine tool comprises a holding device, especially handles and the like, by which the machine tool can be guided by an operator with the tool attached thereto. Typically, the hand guided machine tools are equipped with an electric driving motor, but there are also other types known, such as hydraulically powered machine tools or pneumatically powered machine tools or machine tools driven by muscle power.

In the prior art, a variety of machine tools are known which are intended to be used with a tool device, which has a circumferential or a rotating-oscillating driving device. Such tool devices are for example drills, cutting discs and grinding discs, saws, and so on. The tool devices can be fixed and interchanged with their driving device on the output device of the machine tool. The output device moves—depending on the application, the tool device and the machine tool—at a speed between near 0 to several 1000 rotations/minutes, in extreme cases, it can also turn at a significantly higher rate. During the operation, the tool device is placed with more or less high pressure into contact on a work piece or on a work piece arrangement with which it then executes the corresponding processing operation. The machine tools are often used multifunctional, i.e., for example, for sawing, sanding, scraping, vitrification—here it should be understood in particular as the removal of glass panes from a vehicle body, preferably the severing of an adhesive bead in such a disc, the expert speaks even from removing glass—or the like. Within one application area, different grinding tools must be driven in a short time sequence, for example during grinding, this implies for many applications in frequent changes of the tool devices. The time, which has to be applied for a change of the tool device, has a direct impact on the machine tool productivity, which can be reached. Further, it is extremely important that the machine tool can accommodate particularly secure the tool device, because an inaccurate receiving in accordance with the positioning of the tool device in regard to the machine tool leads to a shortening of the life time. Moreover, a substantial risk of injury, especially for the machine operator arises from an unsafe receiving of the tool devices.

Here, a machine tool with rotating-oscillating driving device should be understood as a machine tool with a movement of the driving device, wherein the driving device is moved starting from a central position in a first rotational direction, is braked to a stop and then moves in the reverse direction of rotation back to a standstill.

The angular distance from the central position to the respective end position may typically be up to 5 degrees. However, at the machines usually lower angle of 1 degree to 2.5 degrees are common, which corresponds to a total angular movement (1. to 2. end position) of 2 degrees to 5 degrees. This oscillatory motion is typically carried out from 5,000 to 50,000 times per minute, there are, however, also smaller and higher oscillation frequencies (here expressed as oscillations/minutes) possible.

Here, a machine tool with a rotating driving device should be understood as a machine tool with a movement of the driving device, in which the driving device continuously moves with a variable speed or a constant speed in one direction. For such machine tools, also be a reversal of the direction of rotation can be allowed, but this then generally requires also a change of the tool device, particularly for a drill with a twist drill unlike for a grinding machine with a grinding tool with undefined edges. The rotational speed of such machine tools ranges from 0 to a few hundred 1/minutes, such as in particular in manually guided drilling machines, over several thousand 1/minutes, such as in particular in angle grinders and saws, up to several tens of thousands of 1/minutes, in particular for special applications.

The present invention has the object to design the machine tool so that a tool device can be reliably received.

This object is achieved by the subject matter of claim 1.

Preferred embodiments of the invention are the subject matter of the dependent claims.

According to the invention, a machine tool comprises a tool receiving device, with which the tool device can be mounted to the machine tool such, that the driving axis and a tool axis of rotation are substantially coincident. However, it is in particular also possible that the tool axis of rotation is outside the tool contour. The term "driving axis" and "tool axis of rotation" denotes the geometrical axis of rotation of the machine tool or the tool device, respectively.

The tool receiving device in each case has at least a clamping device, a holding device and a locking device. The machine tool may also comprise a plurality of tool receiving devices, in particular two or three.

The holding device or at least a part of it, can be moved between at least two positions, the first of these two positions is an open position and the second one is a closed position. In this case, when the holding device is in the first position, the tool device can be inserted into or removed from the tool receiving device. In the second closed position, the tool device is held in the tool receiving device by the holding device. In particular, then it is not possible to insert a tool device into the tool receiving device.

The holding device is applied with a clamping force by the clamping device, preferably from the first open position toward the second closed position. Preferably, the clamping device comprises an elastically resilient device. In a particularly simple case, the clamping device comprises in particular a helical spring device or a disc spring device, but there are also a number of other spring devices conceivable, as explained below. Here, the clamping force in the sense of the invention should be understood as a force action, therefore, in particular a force vector or a pair of force vectors, i.e. in particular a torque.

The locking device can also be moved between at least two positions. Both for the holding device as well as for the locking device it is advantageously possible that even more positions can be taken, in particular a transport position and an assembly-disassembly position may be provided. Wherein a transport position is especially adapted that the machine tool can be transported particularly advantageously, and the assembly-disassembly position is intended that the tool receiving device mounted in the machine tool may be mounted or dismounted. The locking device is also arranged to cooperate with the holding device. The interaction should be understood in particular that the movement of the holding device is directly or indirectly influenced by the locking device. The movement of the holding device can in particular be blocked by the locking device, when the locking device is in the locking position. The blocking should be understood in particular that a movement of the holding device is in at least one direction, preferably in all directions, is prevented.

If the locking device is in a position deviating from the locking position of the holding device, it is possible in particular to move in at least one direction, preferably in the direction from the first open position in the direction towards the second closed position.

The locking device is advantageously designed so that it can be actuated by said tool device. An actuation should be understood in that the tool device applies a force directly or indirectly on the locking device. The locking device can be moved by this force action from the lock position to the unlock position.

By operating the locking device by said tool device, in particular the movement of the holding device from the first open position to the second closed position can be released. In particular, this type of operation allows a very quick and easy insertion of the tool device in the tool machine.

Here, a rotationally oscillating or completely rotating driving device of the tool, as it will be discussed herein, should be understood to be in particular a non hub oscillating drive, such as that of a hack saw device. A hacksaw device should here be understood in particular as a keyhole saw device, a saber saw device or drywall saw device or the like.

In a preferred embodiment the clamping device has at least one spring device. Here this spring device is selected from a group of devices, comprising at least the following elements:
 a gas or oil pressure spring device,
 a sheet or diaphragm spring device,
 a spiral spring device,
 a coil spring device,
 a torsion spring device, in particular a torsion bar spring device,
 an elastomeric spring device, and Further preferably, a clamping device is a combination of several of these devices. Preferably, a clamping device has several same type spring devices, which may be preferably arranged in series circuits or parallel circuits. In particular, by arranging a plurality of spring device in parallel circuits, the reliability of the clamping device can be improved. In particular, by arranging a plurality of spring device in series, an especially flexible tuning of the clamping force effect can be achieved.

In a preferred embodiment the holding device is mounted rotatably at least in one direction of rotation. More preferably, the holding device is mounted movable in translation in at least one direction. Here, a translational movement should be understood to be in particular a linear movement. Further preferably, the holding device is mounted so that it both rotates in the movement from the first open position to the second closed position and shifts. In particular, through such a general trajectory (rocking and sliding motion), a particularly secure and rapid movement of the holding device from a first opened position to a second closed position can be achieved. Preferably, the holding device has a slide bearing device, preferably mounted with a ball bearing device. More preferably, a plain bearing device is designed such as a socket or the like, preferably a roller bearing device is designed as a device having balls, rollers or barrels as rolling elements. In particular, by a slide bearing, the holding device is stored particularly reliable with low probability of default. In particular, through a rolling bearing, the holding device can be mounted particularly easily movable, and thus the operating forces can be kept small to move the holding device.

In a preferred embodiment, the machine tool has a plurality of said holding devices. Preferably, the machine tool has three or four or five or six of these holding devices. Particularly preferably, the tool receiving device has two of these holding devices. In particular, through the use of several of these holding devices, the operational reliability of the machine tool is improved.

In a preferred embodiment, the machine tool has an even number of these holding devices, preferably exactly two of these holding devices. More preferably, two of these holding devices are each mounted movable in opposite directions. More preferably, two of these holding devices are mechanically coupled to each other, in particular so that they move exactly in opposite directions with respect to their speed. In particular, by the opposite movement of the holding devices, a symmetrical tension of the tool device in the machine tool can be achieved, and therefore a particularly secure clamping of the tool device in the machine tool can be achieved.

In a preferred embodiment, the clamping device can apply a locking force action of the locking device. Preferably, this locking force action is then applied when the locking device is in the locked position. From the tool device, preferably an unlocking force action is applied on the blocking device. This unlocking force action is preferably the blocking force action in opposite directions. The locking device moves especially when the unlocking force action is greater than the locking action of force, at least partially toward the unlocking force action. Because the unlocking force action of the tool device can be applied, it is particularly easy to move the locking device from the locking position, thereby a particularly simple and fast tool change is possible.

In a preferred embodiment, the locking device has a first locking surface section and a second locking surface section. Preferably, this first locking surface section contacts this second locking surface section indirectly or preferably directly. Here, an indirect contacting or touching of the locking surface sections should be understood in that this contact or touch is done via an intermediate member. Here, such intermediate member is preferably a sliding element or a rolling element, preferably a roller, a ball, a lever means, a sliding block or the like. Here, the direct contact of the locking surface portions should be understood in that preferably at least these two sections contact directly or are only separated by a sliding or lubricating film. Further preferably, at least one component of the force applied by the clamping device is a clamping force substantially parallel with a normal vector to at least a portion of said first locking surface section or said second locking surface section. Further preferably, this first locking surface section and this second locking surface section comprises at least partially, preferably completely parallel normal vectors. In particular, the fact that they contact the locking surface section directly, a particularly simple locking device can be achieved, which is then particularly reliable to operate. In particular, that these two locking surface sections are in contact by means of an intermediate member, it is possible to provide a locking device, which changes its operating characteristics only slightly due to external parameters such as the temperature, the degree of contamination or the like.

In a preferred embodiment, the clamping device or the locking device has at least one moving element. Preferably, said moving element is connected to the clamping device, that the latter is moved with it. This movement element is further preferably, preferably by means of the clamping device, movable along a first direction of movement. More preferably, this direction of movement is at least partially rotationally and/or translationally. Preferably, this locking device comprises a contact surface, whereby this contact surface is particularly adapted that the locking device is contacted by this moving element. Preferably, this locking device can be slided against this moving member or be mounted on roller bearings, or contact these locking devices and this moving member in a sliding contact or a rolling contact. Such a sliding movement between the locking device and this moving element is particularly simply made, and a particularly reliable operation of the moving member by the clamping device can be achieved. A rolling contact or a roller bearing is generally insensitive to external influence parameters and therefore leads in particular to a particularly reliable contacting of the locking device by the moving element.

In a preferred embodiment, an angle $\gamma_1$ is defined by a normal vector in this contact area in a contact point of the moving member with the locking device, especially if it is in the locked position. The size of the angle $\gamma_1$ can be influenced in particular by the fact that the profile of the contact surface is selected according to the known movement direction of the moving element. Here, this contact surface is preferably designed so that the angle $\gamma_1$ is greater than 80 degrees, preferably greater than 90 degrees and particularly preferably greater than 120 degrees. More preferably, the contact surface is designed so that the angle $\gamma_1$ is preferably less than or equal to 315 degrees, preferably less than 270 degrees and particularly preferably less than 210 degrees. More preferably, the angle $\gamma_1$ is substantially 186 degrees. In this context, substantially 186 degrees is an angle of preferably 175 degrees to 195 degrees, preferably 180 degrees to 190 degrees and particularly preferably 185 degrees to 187 degrees, and most preferably 186 degrees to +/−0.5 degrees. By choosing the angle $\gamma_1$ from said range, it can be achieved that the force for inserting the tool device is low, and on the other hand, that the tool holding device is securely held in the open position. The contact surface forms in connection with this moving element, in particular, an inclined plane, so that it can be influenced of the moving member to the clamping device by the appropriate choice of the course of the contact surface, in particular by a force gain that can be achieved. Through a high clamping force, which can be achieved in particular by the choice of the course of the contact area, a particularly secure holding of the tool device in the tool receiving device can be achieved.

In a preferred embodiment, an angle $\gamma_2$ is defined by the normal vector in the contact surface in a contact point of the moving member with the locking device, in particular when the latter is in the unlock position with the movement direction of the moving member forms an angle $\gamma_2$ a. This angle $\gamma_2$ is preferably selected from a specific range, preferably the angle $\gamma_2$ is less than or equal to 180 degrees, preferably less than 135 degrees and particularly preferably less than 115 degrees. More preferably, the angle $\gamma_2$ is greater than or equal to 80 degrees, preferably greater than 95 degrees and most preferably greater than 105 degrees. More preferably, the angle $\gamma_2$ depending on the position of the locking device, especially when it is not essentially in the locking position, so chosen that it is smaller than or equal to 180 degrees, preferably less than 135 degrees and particularly preferably less than 115 degrees, and more preferably the angle $\gamma_2$ is greater than or equal to 80 degrees, preferably greater than 95 degrees and most preferably greater than 105 degrees, and especially 108 degrees to 112 degrees. In particular, by an appropriate choice of the angle $\gamma 2$, it is possible that the locking device holds automatically in the open position. In particular, by the fact of holding the locking device in the open position, a fast tool change is possible.

In a preferred embodiment the locking device comprises at least a first lever member, a second lever member and a connecting member. In a further preferred embodiment, at least a first or a second, particularly preferably, however, both lever members are rotatably mounted. Here, these lever members or at least one of these levers members may be a roller or a plain bearing. More preferably, this first lever member is adapted to be contacted by this connection element in a first contact area. More preferably, this second lever member is adapted to be contacted by this connection element in a second contact area. Here, this contacting can be done in each case by means of a rolling bearing or a sliding bearing. The connection element can directly or indirectly contact the lever members or one of these lever members. Here, the indirect contact means in particular that the connection element contacts the lever member by means of an intermediate element such as a roller or a sliding element.

In a preferred embodiment, this locking device is configured such that it is in its locking position in an over-center position. This is achieved in particular by special geometric conditions and positions of these lever members and the connection element. Preferably, a line passing through this first contact region and through this second contact region has a distance a_1 to this pivot point d_2 of the second lever element. More preferably, a force effect F_1 acts along the connection line on this second lever member on the basis of this first lever member. Therefore, the force effect F_1 causes a first torque T_1 on this second lever member around the pivot point d_2. In particular, by this arrangement of the lever members, the second lever member is pushed in a preset direction by the torque T_1, thus achieving a secure position for it.

In a preferred embodiment, the force effect is directly or indirectly applied by the tool device during the insertion of the tool device in the machine tool on the locking device. Preferably, a force F_2 is transferred to the second lever member. More preferably, an effect direction of this second force action F_2 is at least spaced by this point of rotation d_2 of the second lever member by a distance a_2. In particular, by distance a_2 and this second force effect F_2 cause a second torque T_2 on the second lever member. The size of the second torque T_2 is particularly dependent on the force on inserting the tool device in the machine tool. More preferably, this first torque is $T\_1$ opposes this second torque $T\_2$. Stated differently, in particular this second torque $T\_2$ leads to a movement of said second lever member, which is directed opposite to the movement of said lever member, which is caused by said first torque $T\_1$, when the second torque $T\_2$ exceeds the first torque $T\_1$. More preferably, the first torque $T\_1$ moves this second lever member towards a mechanical stop, the second lever member moves away from this mechanical stop especially when the second torque $T\_2$ exceeds the first torque $T\_1$. In particular, by the force ratios a particularly safe, but preferably also simply inserting of the tool device into the machine tool can be achieved.

In a preferred embodiment, a connection line which passes through this first contact region and through this second contact portion, when the locking device is in the unlock position, has a third distance $a\_3$ to the pivot point $d\_2$ of the second lever member. Preferably, a third force action $F\_3$ is transmitted in the direction of this connection line on this second lever member of this first lever member. In particular, by this force effect $F\_3$ and this distance $a\_3$, a third torque $T\_3$ is transferred to this second lever member. It is pointed out that in particular the first torque $T\_1$ and the second torque $T\_2$ can occur simultaneously, because the two torques can occur, when the locking device is in the locked position. The third torque $T\_3$ occurs when the locking device is in the unlock position or it is moved into this. In particular, by this third torque $T\_3$, the locking device is securely held in the unlock position, while no other intervention of the operator is particularly necessary and picking up the tool device in the machine tool is done very quickly and safely.

In a further preferred embodiment, the direction of action of this third torque $T\_3$ is directed against the direction of action of this first torque $T\_1$.

In a further preferred embodiment, the connection device of the machine tool has a torque transmission region. Here, this torque transmission section is adapted to transmit the driving forces of the machine tool on the tool device. Here, the driving forces should be understood to be in particular a linear force action, a force pair or a torque. Preferably, such a force pair or a torque act such around the driving axis. This torque transmission region has at least two output area regions arranged at a distance from the driving axis. Preferably, an output area region has a plurality of surface points.

The term of the surface point should be understood geometrically. The term is used to indicate the geometric point at which a tangent plane applies to a surface. The vector on the surface point perpendicular to the tangent plane describes the orientation of the surface at this point in a space, which is defined by, for example, a three-dimensional coordinate system or by other reference planes or reference surfaces.

An surface has endless number of surface points because every point on the surface is also a surface point in this sense. To describe a unidirectional or bidirectional curved surface for the practice, however, a finite number of surface points is sufficient. The term unidirectionally curved should be understood as a cylindrical surface, curved at each surface point in only one direction. The term bidirectionally curved should be understood as curved in at least one surface point in several directions, for example a spherical surface.

A flat surface has only one tangent plane, which coincides with the surface itself. To indicate a flat surface thus a single surface point is sufficient, and this can be any point of the flat surface.

Since surface points are geometric points, they are not visible on the surface.

Further preferably, the tangent planes are at least on one of, preferably on several of, and particularly preferably on all of these surface points inclined to an axial plane. Further preferably, the tangent planes are at least on one of, preferably on several of, and particularly preferably on all of these surface points inclined to a radial plane. Here, a radial plane should be understood to be, in particular a plane, which is arranged orthogonal to this driving axis, more preferably an axial plane should be understood be a plane that in particular includes the driving axis. In particular, by such a design of the torque transmission region, a backlash-free receiving of the tool device on the machine tool is possible, and thus a particularly rapid and reliable method of attaching the tool device to the machine tool is possible.

According to a preferred embodiment, there is at least one output area region, for which at no surface point the normal vector on this surface point is on a straight line, which passes through the driving axis. Such an output area region is therefore in no surface point oriented toward to the driving axis, but the output area region is in regard to the driving axis "twisted".

As already explained, the output area regions are preferably formed substantially flat. This means that the output area regions have a flat portion having substantially the same tangent plane, which may be limited by edges, single or multi-curved surfaces, etc., or they may pass over edges or curved regions into other regions of the tool device.

The advantage of the flat output area regions is that by this a tool receiving device can be provided, which can on the one hand, receive the tool device free of backlash—if it is designed accordingly—and in which, with appropriate tolerances and material properties such as elasticity, etc., a surface contact is possible between the output device/torque transmission region of the machine tool and the drive device of the tool device, which increases the range of force transmission.

According to a further preferred embodiment, the output area regions are curved at least in sections. The curvature may be designed with a fixed or a variable radius of curvature both unidirectional, as well as bidirectional, convex, concave.

The curved surfaces can also be designed so that they are subjected to elasticity by their form and the material elasticity, through which the curvature changes and in particular by which the curvature disappears at a given load substantially, i.e., then it is substantially a planar output area.

In a preferred embodiment, the machine tool in the area of the torque transmission region has at least a first upper boundary plane and at least a second lower boundary plane. In this case, these boundary planes are disposed substantially perpendicular to said driving axis of rotation. Further preferably, these two boundary planes are spaced apart. Preferably, each of these output area regions is arranged between one of these first upper boundary planes and one of these second lower boundary planes, preferably so that the output area region contacts the respective boundary plane, but does not cut. In particular, by the arrangement of at least one output area region between these boundary planes a particularly large output area region can be achieved, and the stress on this output area region is correspondingly low. Preferably, a first group of output area regions, but at least one output area region is disposed between one of these first upper boundary planes and one of these the second lower boundary planes, and more preferably a second group of output area regions is disposed between a further first upper boundary plane and a further second lower boundary plane. In particular, by the grouping of several output area regions and by the assigning of these to boundary planes, both is a simple production of the torque transmission region is possible, as well as on the other hand, a particularly homogenous torque introduction into the tool device can be achieved.

In a preferred embodiment, a plurality of output area regions extends between a single first upper boundary plane and a single second lower boundary plane. More preferably, all of the output area regions extend between a single first upper boundary plane and a single second lower boundary plane. In particular, by the extension of these output surface regions between one first upper boundary plane and one second lower boundary plane a torque transmission region with low space requirement can be achieved, and a minimal use of materials is required in the production. It is also advantageous, in particular by this type of design of the output area regions, that the torque is transferred particularly uniform to the tool device and thus gentle to the material.

In a preferred embodiment, the torque transmission region has a plurality of output area regions. Preferably, said plurality of output area regions is arranged rotationally symmetrically around the driving axis.

"Rotationally symmetrical around the tool axis of rotation" in the sense of the present application should mean that the plurality of driving area regions merges seen geometrically into itself by rotating around the tool axis of rotation by at least an angle being greater than 0 degrees and smaller than 360 degrees—or also by any angle. In particular, one of these angles is 360 degrees/n, where n is a natural number greater than 1.

In particular, by a rotationally symmetrical arrangement of the output area regions, it is possible to reduce additional stresses on the torque transmission region and to stress the output area regions evenly, and thus in particular to achieve an increased service life.

In a preferred embodiment, at least two of these output area regions are arranged symmetrically to a plane of symmetry. Preferably, this plane of symmetry is coincident with one of these axial planes. Preferably, more than two of said output area regions are arranged symmetrically to a plane of symmetry, preferably four. In particular, the driving axis is in this plane of symmetry. More preferably, these output area regions are arranged substantially contiguously. Particularly, it should be understood as such an arrangement abutting each other as an arrangement according to the invention, when the output area regions are connected by a transition region. Preferably, such a transition region may be formed by a curved area region or by a least partially flat extending area region. Further preferably, such a transition region adjoins at least one, preferably both of these output area regions tangentially. In particular, by a symmetrical and abutting arrangement of the output area regions, a particularly high stability of the torque transmission region can be achieved, and therefore a good force transmission to the tool device can be achieved.

In a preferred embodiment, the torque transmission region has a side wall. Preferably, said side wall is extending radially spaced from the driving axis. Further preferably, this side wall is extending between the first upper boundary plane and the second lower boundary plane. Preferably, this side wall comprises the output area regions. In particular, the design of the torque transmission region with a side wall results in a substantially hollow conical recess in the region of the torque transmission region, but this hollow conical recess has no circular cross section, but a cross section with a variable spacing of the side wall to the driving axis in a direction orthogonal to the driving axis. In particular, by the described type of embodiment of the torque transmission region, a particularly stable torque transmission region, and thus a good introduction of the torque into the tool device can be achieved.

In a preferred embodiment, this side wall extends essentially radially closed around the driving axis. In another embodiment, the side wall has recesses or interruptions on in its extension around the driving axis. In particular, by a closed circumferential side wall, a particularly stable torque transmission region can be achieved; by a broken side wall or by a side wall having recesses, a torque transmission region can be achieved which has particularly light and low momentum of inertia.

In preferred embodiment, one of the normal vectors on one of these tangent planes is oriented in the radial direction away from driving axis. It should be noted that the terms normal and normal vector are used interchangeably in the context of these explanations. Preferably, the normal vectors of several of, preferably of all of these tangent planes in the radial direction are oriented away from driving axis. In particular, by this orientation of the tangent planes, the torque transmission region provides the shaft as compared to a conventional shaft hub connection. This configuration of the torque transmission region provides in particular the possibility of a simple production, and that the driving forces of the machine tool are can be transmitted particularly uniform on the tool device.

In a preferred embodiment, one of the normal vectors on one of these tangent planes is oriented in the radial direction to the driving axis. Preferably, the normal vectors of several of, preferably of all of the tangent planes are oriented in the radial direction to the driving axis. In particular, by this orientation of the tangent planes, the torque transmission region provides the hub portion in comparison with a conventional shaft hub connection. With other words, the torque transmission region is constituted at least partially as a recess. In such a configuration of the torque transmission region, the driving forces are transmitted by to internal surface (hub portion), such surfaces are protected particularly well against dirt and damage.

In a preferred embodiment, the angle $\alpha$ is included between one of these tangent planes and this radial plane, wherein said radial plane is perpendicular to the output shaft. Preferably, the angle $\alpha$ is selected from a certain range, wherein the angle $\alpha$ is preferably smaller than 90 degrees, in particular it is smaller than 80 degrees and most preferably it is smaller than 75 degrees. Further preferably, the angle $\alpha$ is greater than 0 degrees, in particular it is greater than 45 degrees, and most preferably it is greater than 60 degrees. More preferably, the angle $\alpha$ is in a range between 62.5 degrees and 72.5 degrees. Preferably, the angle $\alpha$ is selected in the above mentioned range due to the component properties (in particular the geometry, the wall thickness, the modulus of elasticity, the strength and the like) of the torque transmission region and/or the tool device and/or it is preferred because of the occurring forces. In particular, by the previously described selection of the angle $\alpha$ out of said range, a stable torque transmission region can be achieved, and on the other hand also a uniform introduction of the driving forces into the tool device. It is usually preferred to choose the angle $\alpha$ smaller than 70 degrees, since the risk of jamming is then lower. Here, the term "jamming" should be construed in such a way that the tool device can not be removed from the machine tool as scheduled, which means in particular without an additional force. Effects similar to this "jamming" are known in mechanics especially as a self-locking. As an advantage, an angle α, which has been selected from said range (α≥70 degrees), results into a particularly low space requirement. As a further advantage, the tendency to the jamming of the tool device can be reduced in this torque transmission region by a smaller angle α (α<70 degrees). As a particularly preferred range for the angle α, the range of 60 degrees (+/−5 degrees) has shown that in this way a relatively small installation space can be achieved and that an accidental jamming of the tool device can be reduced or avoided.

In a preferred embodiment, the angle ß is enclosed between one of these tangent planes and this axial plane, wherein the output shaft is located in this axial plane. Preferably, the angle ß is selected from a certain range, wherein the angle ß is preferably smaller than 90 degrees, in particular it is smaller than 70 degrees, and most preferably it is smaller than 65 degrees. Furthermore, preferably, the angle ß is greater than 0 degrees, preferably it is greater than 15 degrees and most preferably it is greater than 30 degrees. More preferably, the angle ß is substantially 30 degrees, 45 degrees or 60 degrees. More preferably, the angle ß deviates only slightly from one of the aforementioned three values of the angle, wherein preferably slightly below a range should be understood as of preferably +/−7.5 degrees, in particular of +/−5 degrees and most preferably of +/−2.5 degrees. In particular, by the described selection of the angle ß out of said range, a particularly stable torque transmission region can be achieved, and thus a uniform torque introduction from the machine tool to the tool device can be achieved. The transmittable torque increases in particular with a decreasing angle ß. Preferably, for configurations which desire a high transmittable torque, the angle ß is selected from a range of 0 degree<ß<30 degrees. In particular, the space requirements decrease with an increasing angle ß. Preferably, for configurations that desire a small space requirement, the angle ß is selected from a range from 60 degree<ß<90 degrees. In a particularly preferred embodiment, in which a large torque is particularly transmittable and a low space requirement is desired, the angle ß is essentially 60 degrees.

In a preferred embodiment, the torque transmission region has an even number of output area regions. Preferably, the torque transmission region has 4 or more output area regions, in particular it has 8 or more output area regions, and most preferably it has 16 or more output area regions. Further preferably, the torque transmission region has 64 or less output area regions, in particular it has 48 or less output area regions and most preferably it has 32 or less output area regions. Furthermore, preferably, the torque transmission region has an odd number of output area regions, and preferably it has even number of output area regions. Preferably, the number of the output area regions is a function of the size of the torque transmission region. Further preferably, a large torque transmission region may also have larger numbers of output area regions than those specified here. Here, a large torque transmission region should be understood in particular as a torque transmission region, which has essentially a diameter exceeding 50 mm or more. In particular, by the even number of the output area regions, the driving forces of the machine tool can be transmitted in pairs on the tool device. It has been found that a particularly durable and thus improved torque transmission region can be achieved, in particular by this introduction in pairs of the driving forces on the tool device.

In a preferred embodiment, the output area regions are substantially arranged in a star-like manner. Preferably, the output area regions are substantially arranged in a star-like manner around the driving axis. Further preferably, by the output area regions, a three-dimensional body is described, which being cut by a plane orthogonal to the driving axis has essentially the base area of a star-shaped polygon.

In the sense of the present invention, the term polygon should not only be understood to be the mathematically exact form having obtuse angled corners or acute angled corners, but it should also be understood as a form in which the corners are rounded.

Preferably, said star-shaped polygon is rotationally symmetrical. More preferably, the star-like disposed driving area regions appear similar to a toothed shaft of a conventional shaft hub connection, wherein the shaft has a conical basic shape due to the double inclination of the driving area regions. In particular, by the star-shaped arrangement of the output area regions it is possible to arrange a plurality of output area regions in a small space and to transmit a large driving force from the machine tool securely to the tool device.

In a preferred embodiment, the machine tool has an encoding region or an encoding element. Preferably, such an encoding region has a cross-sectional area, preferably the cross-sectional area is arranged in a plane which is substantially orthogonal to the driving axis. Preferably, this encoding element has an axial extension substantially orthogonal to this cross-sectional area and therefore in particular parallel to the driving axis. In particular, by this axial extension and its alignment, it is possible that an encoding device of a tool device cooperates particularly well with this encoding region, and thereby is particularly safe receiving of the tool device into the machine tool can be achieved.

In a preferred embodiment, one of these encoding regions is arranged rotationally symmetrically in regard to this driving axis, and thus particularly also in regard to this tool axis of rotation. Preferably, a plurality of encoding regions are arranged rotationally symmetrically in regard to this driving axis. Preferably, these encoding regions are offset by fixed predetermined angular increments around the driving axis. Preferably, the angular increment has the size of 1 degree, 2.5 degrees, 10 degrees, 15 degrees, 22.5 degrees, 30 degrees or 45 degrees, more preferably an integral multiple of such angular increments results into a full circle of 360 degrees. In particular, through this distribution of encoding regions, it is possible to offset the tool device according to the present angular increments around the driving axis and to receive it back safely, thereby a very secure receiving of the tool device can be achieved, and in particular a fast inserting of the tool device into the machine tool can be achieved.

In a preferred embodiment, the encoding section, in particular the cross-sectional area of the encoding section is selected from a particular group of geometric shapes. Here this group includes preferably.

- a polygon with a plurality of corners, preferably 3, 4, 5, 6, 7, 8, 9, 10 or more corners,
- a circle,
- an ellipse,
- a spline,
- a basic form with a plurality of straight lines which are connected to each other by arcs
- a combination of several of the mentioned elements.

In particular, the encoding portion of the machine tool has the conter shape compared to an encoding device on the tool device in order to preferably interact with it.

A machine tool system comprises a machine tool according to the present invention and at least one tool device for the use with this machine tool. In this case, the holding device comprises least on an operating area for the transmission of the force acting on the tool device. This operating area is preferably arranged on the side of the holding device facing the machine tool. Further preferably, the holding device comprises a holding device boundary surface. This holding device boundary surface is arranged on the side of the holding device facing away from the machine tool side. Preferably, the operating area of the holding device is adapted to transmit a holding force to the tool device. Preferably, the holding device boundary surface is arranged substantially opposite to the operating area.

The tool device comprises a tool attachment region and a tool axis of rotation. In this case, this tool attachment region has at least one side wall. This tool attachment region extends in an axial direction between a first orthogonal plane and a second orthogonal plane, wherein at least one component of the extension of the tool attachment region is facing towards the tool axis of rotation. In this case, such an orthogonal plane is arranged in particular orthogonally to the tool axis of rotation. More preferably, this side wall is radially spaced to this tool axis of rotation and it has an axial extension in the direction of the tool axis of rotation. More preferably, this side wall is extending radially closed or preferably interrupted or with these recesses around the tool axis of rotation.

If the tool device is accommodated in the machine tool by this holding device, a force action is exerted in the area of the operating area of the holding device, in particular a holding force effect, which holds the tool device on the machine tool. This force action, in particular the holding force action has at least one component in the direction of the tool axis of rotation, and preferably this component of the force action is substantially parallel to it.

In a preferred embodiment, the holding device boundary surface and the operating surface of the holding device are arranged between the first orthogonal plane and the second orthogonal plane of this tool attachment region, when the tool assembly is received on the machine tool. Further preferably, the holding device boundary surface and the operating surface of the holding device are arranged in the axial direction in the region of the axial extension of the tool driving surface regions, when the tool device is received on the machine tool. Preferably, the tool attachment region forms an annular shape, and preferably it forms a conical shape. Further preferably, the operating area of one of, preferably of all the holding devices is disposed radially and axially inward of this shape, when the tool device is received on the machine tool. In particular, by such a configuration of the tool device and the machine tool, it is possible that the holding device does not protrude axially over the tool device. Thus, a particularly safe operation of the machine tool system is made possible.

In a preferred embodiment, the side wall of the tool device has tool driving area regions. Preferably, these driving area regions extend in the radial direction at least partially between a first radial distance and a second radial distance to this tool axis of rotation. Further preferably, one of these areas is adapted for the transmission of the torque or the transmission of the driving force from the machine tool to the tool device. Further preferably, the torque transmission area of the machine tool has at least partially the geometric conjugated progression to this tool driving area region. In particular, by this radial extension of tool driving area region, a form fit driving force transmission is possible, and therefore it allows for a particularly safe form of the driving force transmission from the machine tool to the tool device.

The following figures show various features and embodiments of the invention and are partially in schematic form, wherein a combination of individual features and embodiments beyond the figures is also possible.

FIG. 2A shows the closed position and FIG. 2B shows the open position.

FIG. 3A shows the closed position and FIG. 3B shows the open position.

FIG. 4A shows the open position and FIG. 4B shows the closed position.

FIG. 5A shows the open position and FIG. 5B shows the closed position.

FIG. 6A shows a front view and FIG. 6B shows the closed position.

FIG. 8A shows a plan view and FIG. 8B shows a front view.

FIG. 9A shows a plan view and FIG. 9B shows a front view.

10 shows a torque transmission area and the inclination of essentially the output area regions (tangent plane) by the angle α.

Figure 11:
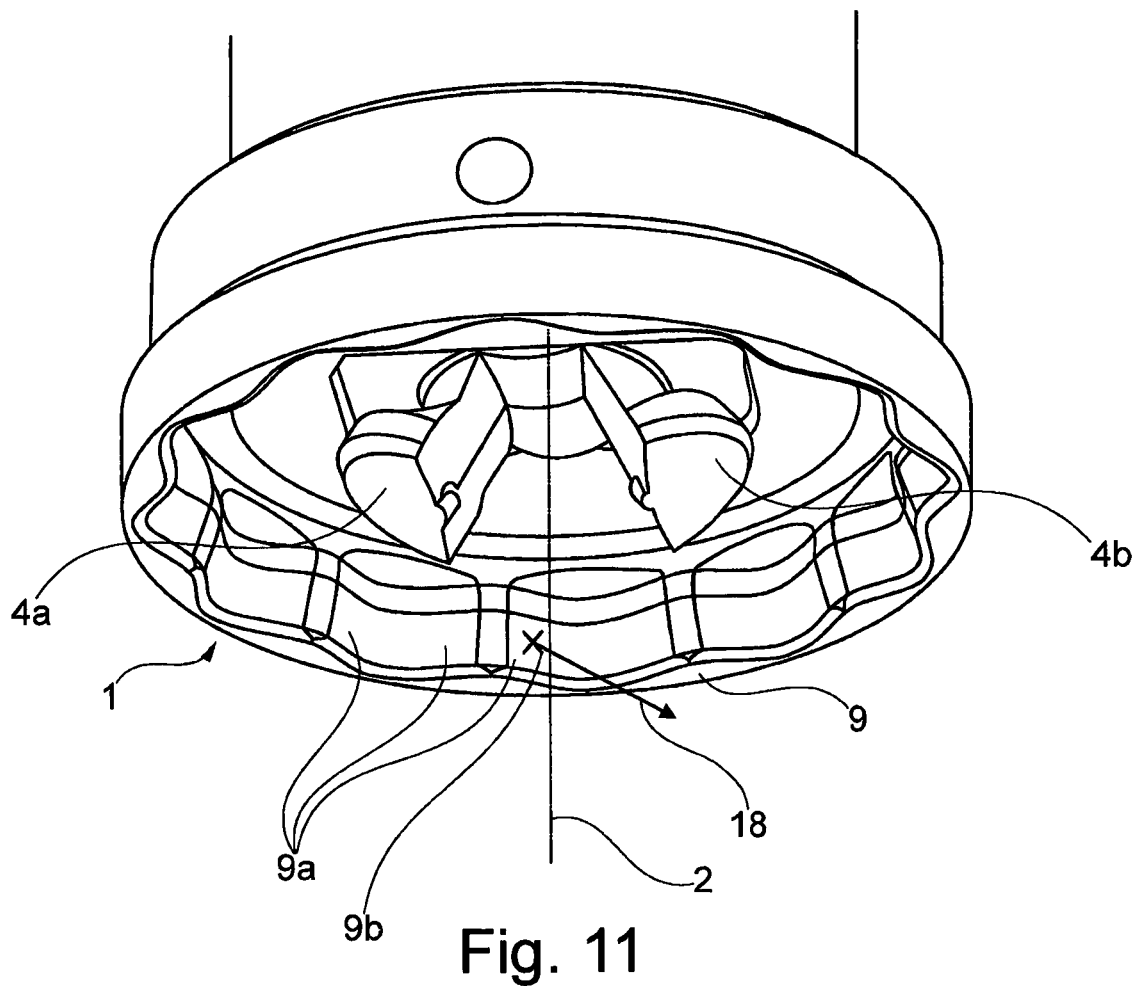

FIG. 11 shows a torque transmission region with a star-shaped arrangement of the output surface areas around the drive shaft.

FIG. 12A shows a plan view of an embodiment of a torque transmission region with a star-shaped arrangement of the output area regions.

FIG. 12B shows a side view of an embodiment of a torque transmission region with a star-shaped arrangment of the output area regions.

Figure 13:
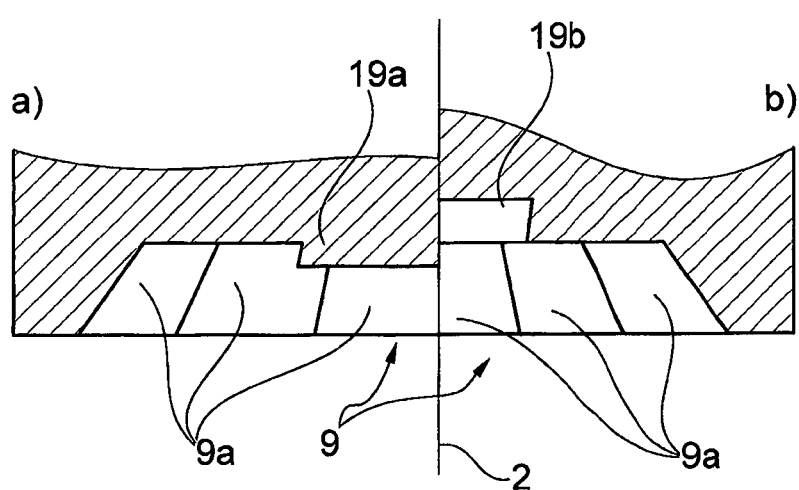

FIG. 13 shows two sectional views of torque transmission regions with different embodiments of the encoding devices, where FIG. 13A is one embodiment and FIG. 13B is another embodiment.

Figure 14:
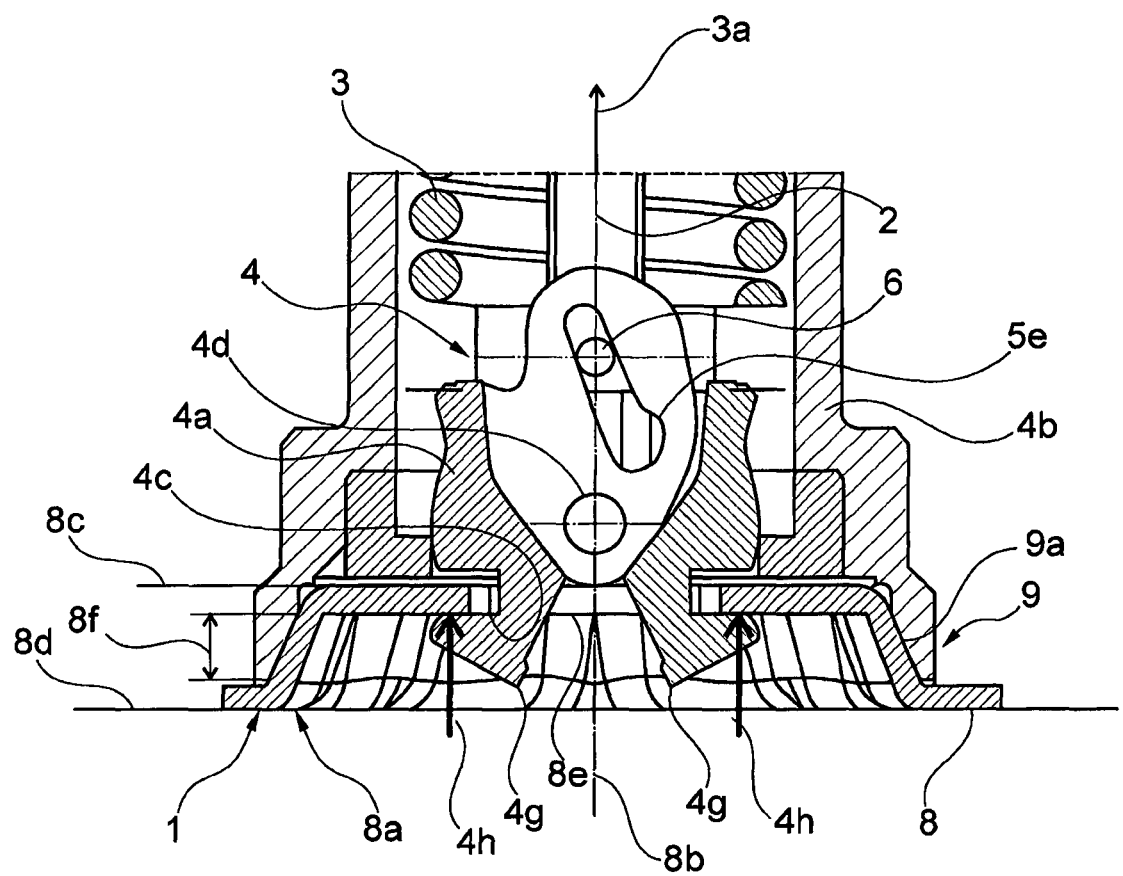

FIG. 14 shows a partial sectional view of an embodiment of a machine tool system.

Figure 15:
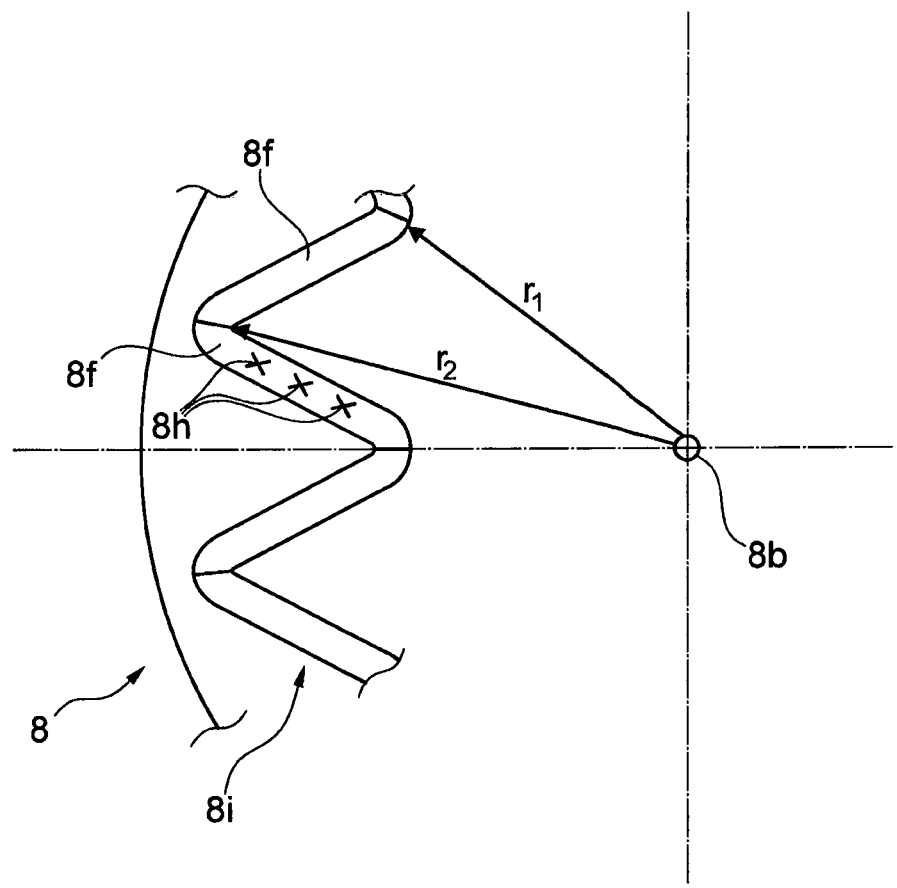

FIG. 15 shows a plan view of a portion of an embodiment of the tool device with a tool side wall.

Figure 16:
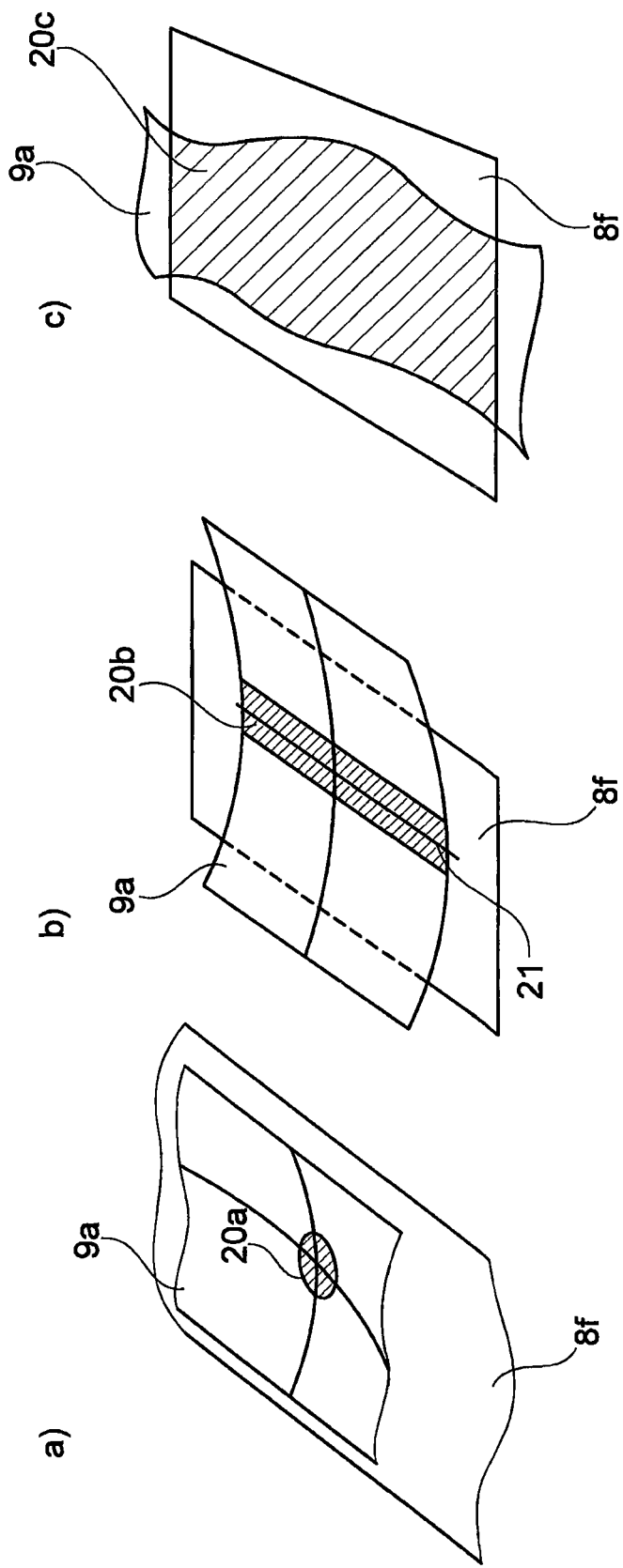

FIG. 16 shows perspective views of several contact regions: FIG. 16A shows a point-shaped contact region; FIG. 16B shows a line-shaped contact region; and FIG. 16C shows an area-shaped contact region between the output area region of the torque transmission region and the tool driving area region.

Figure 17:
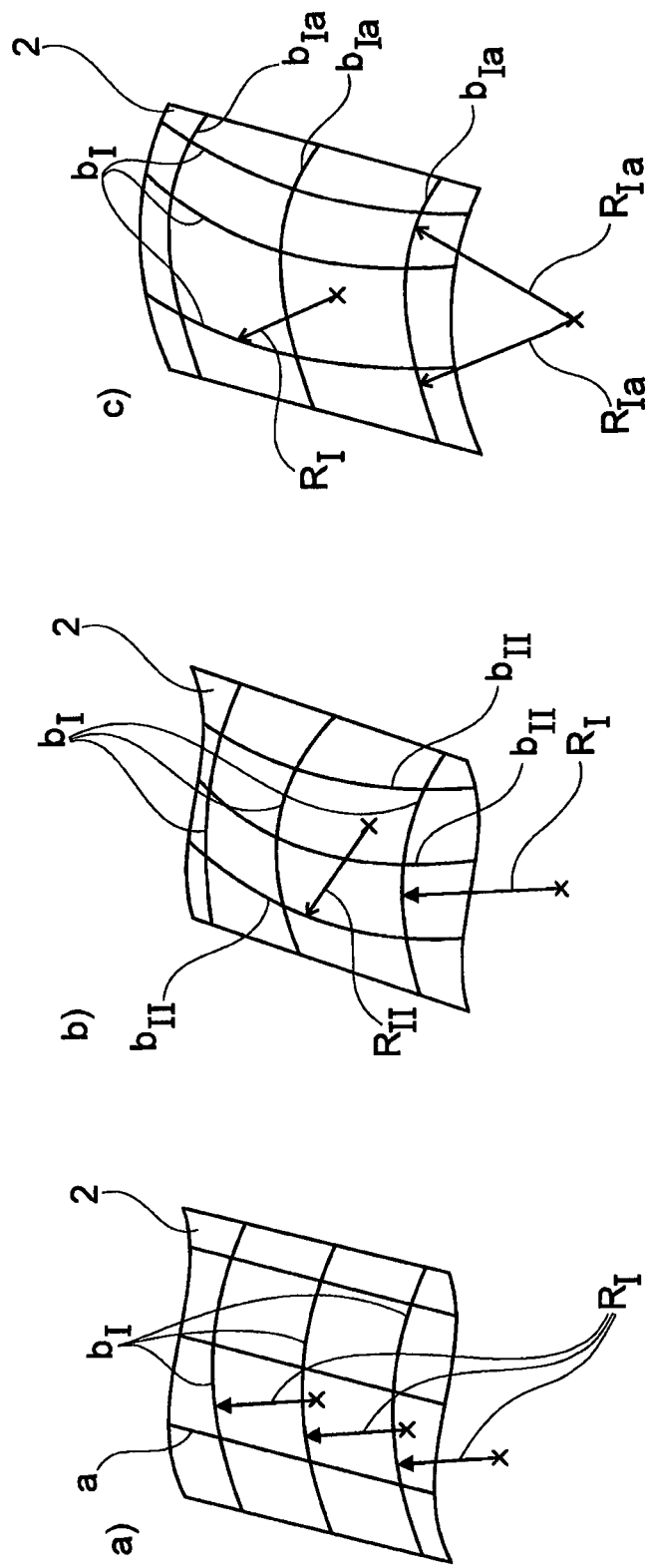

FIG. 17 shows perspective views of sections of differently curved output area regions: FIG. 17A shows a unidirectionally curved section of an output area region; FIG. 17B shows a bidirectional curved section of an output area region; and FIG. 17C shows a bidirectional curved section of an output area region.

FIG. 18 shows a side view of a machine tool with a tool device.

Figure 1:
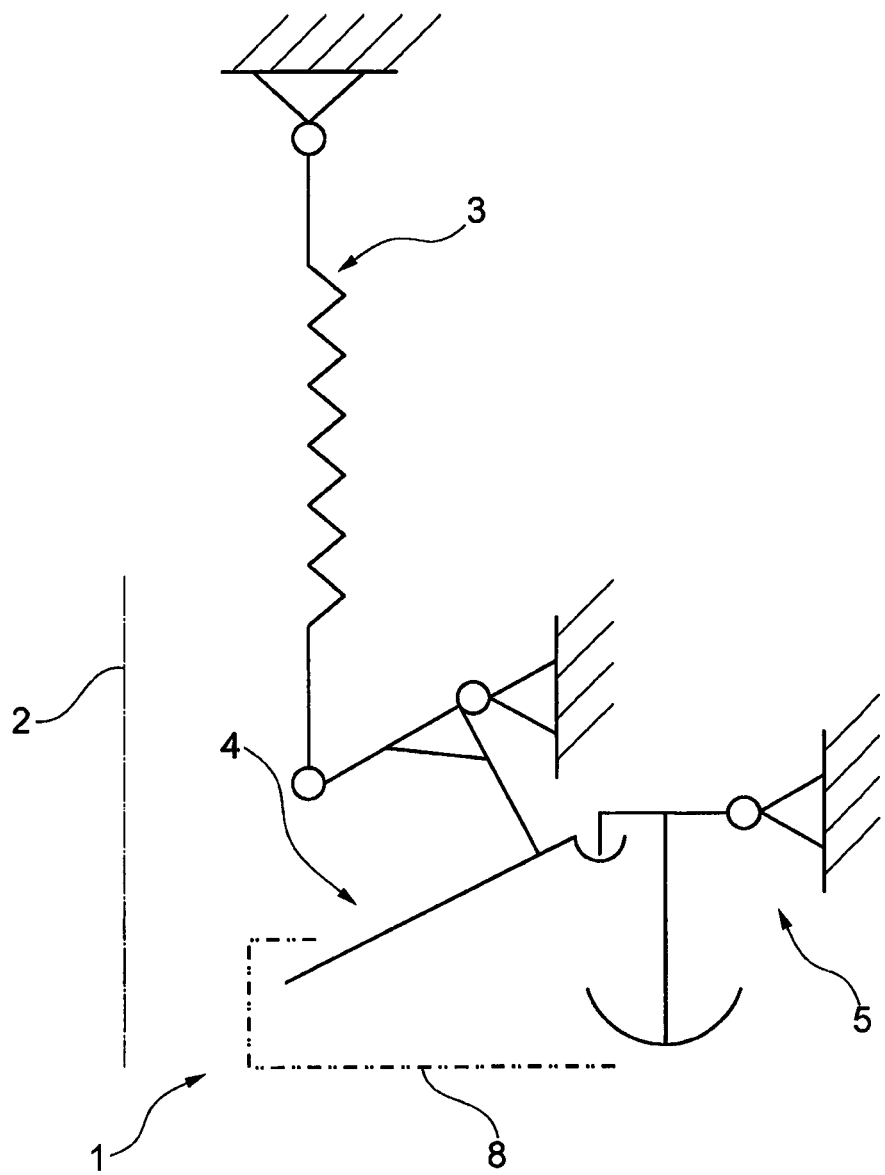
FIG. 1 shows a partial schematic illustration of a tool receiving device of a hand guided machine tool.

The FIG. 1 shows a schematic illustration of a tool receiving device 1 for a hand guided machine tool. By this tool receiving device 1, a tool device 8 can be received on the machine tool. Here, a tool axis of rotation and a driving axis 2 of the machine tool are substantially coincident. The tool holder device 1 is designed such that it is actuated by a locking device 5 on the receiving of the tool device 8. The locking device 5 is intended to hold a holding device 4 in an opened position. This holding device 4 is loaded in the open position by means of a clamping device 3 in the direction of a closed position. In the closed position, the tool device 8 is received on the machine tool and it is held by the holding device 4 thereto. If the tool device 8 is removed from the tool receiving device 1, the locking device 5 holds the holding device 4 again in the open position and releases it again only in the direction of the closed position, when the locking device 5 is operated by means of the tool device 8. By such a tool receiving device 1, both a tool-free changing of the tool device 8 can be achieved, as it is common in hand guided machine tools, as well as, on the other hand, this tool change can be particularly easy achieved.

Figure 2:
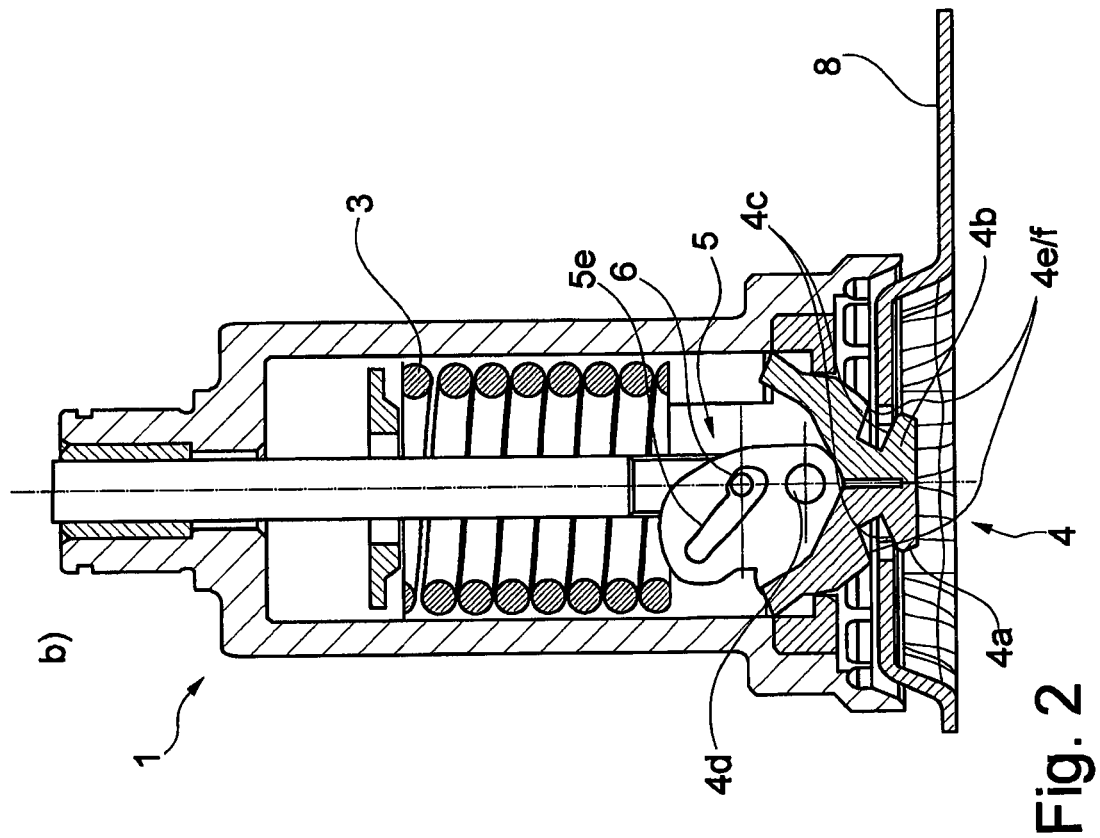
FIG. 2 shows two sectional views of the tool receiving device.
Figure 2:
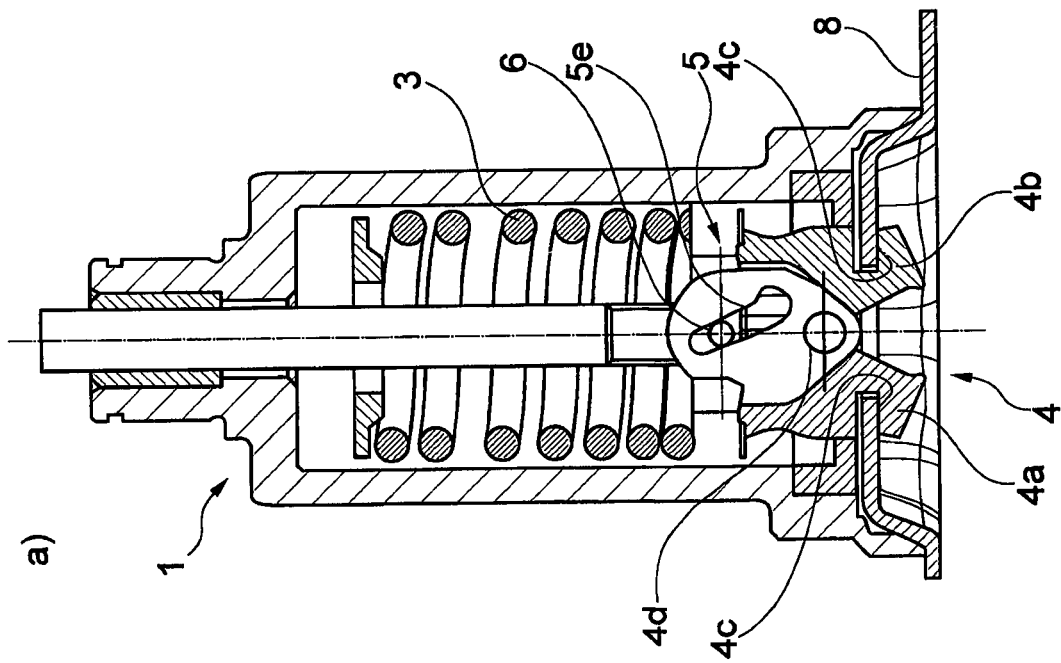

The FIG. 2 shows two sectional views of the tool receiving device 1 (FIG. 2*a* closed position, FIG. 2*b* open position). Here, the closed position 1, FIG. 2*a*, of the tool receiving device means that the holding device 4 is closed and the tool device 8 is accommodated on the tool receiving device. The open position, FIG. 2*b*, means that the holding means 4 is opened and that the tool device 8 can be inserted into the tool receiving device or that it can be removed therefrom. The tool receiving device 1 has a clamping device 3, a holding device 4 and locking device 5. The holding device 4 has two hook devices 4*a* and 4*b* which can be moved in the opposite direction. The hook devices 4*a*/4*b* are rotatably mounted around a common pivot point 4*d* in the tool receiving device. For holding the tool unit 8, the hook devices 4*a*/4*b* each comprises holding surfaces 4*c*. The locking device 5 has a slot-like guide recess 5*e*, wherein the locking device 5 is formed integrally with the first hook device 4*a*. A moving element 6 engages into the guide recess 5*e* and connects the hooks device 4*a*/4*b* with the clamping device 3 by means of the locking device 5. Due to the clamping device, the holding device 4 is held in the closed position. In the open position, FIG. 2*b*, the moving element 6 is supported in the guide recess 5*e*. On the inserting of the tool device 8 in the tool receiving device 1, the tool device contacts the hook device 4*a*/4*b* in the region of the actuating regions 4*e*/4*f*. By contacting the tool device 8 with the hook device 4*a*/4*b*, a torque is applied on these devices in the direction of the closed position, and for an appropriate size of the torque, the closing of the tool receiving device is initiated. By the two hook devices 4*a*/4*b*, which can be moved in the opposite direction, and the moving element 6, which can be moved in the guide recess 5*e*, a particularly simple and secure tool receiving device with few components can be obtained.

Figure 3:
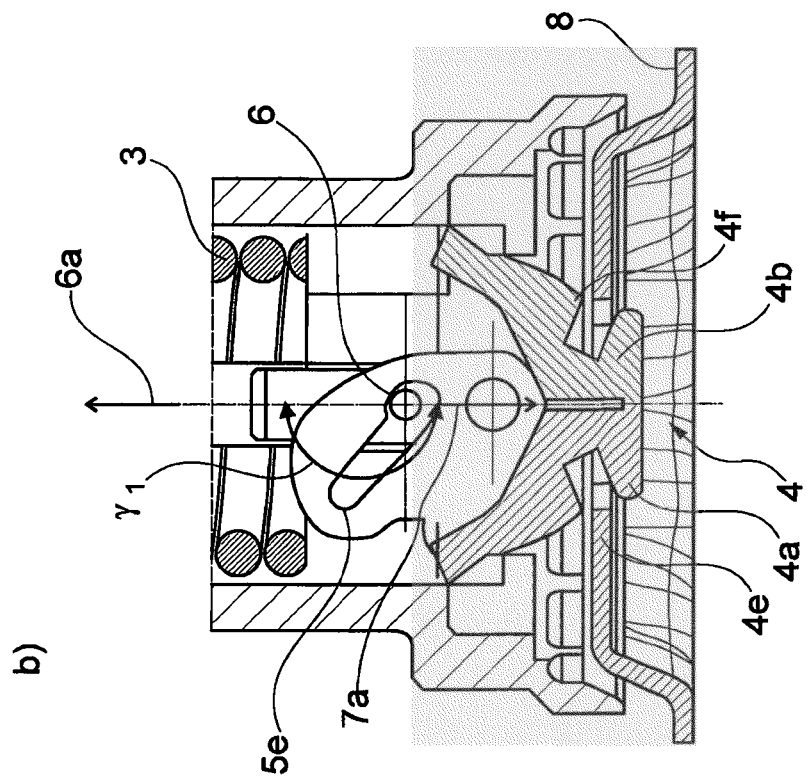
FIG. 3 shows two further sectional illustrations of an embodiment of the tool receiving device.
Figure 3:
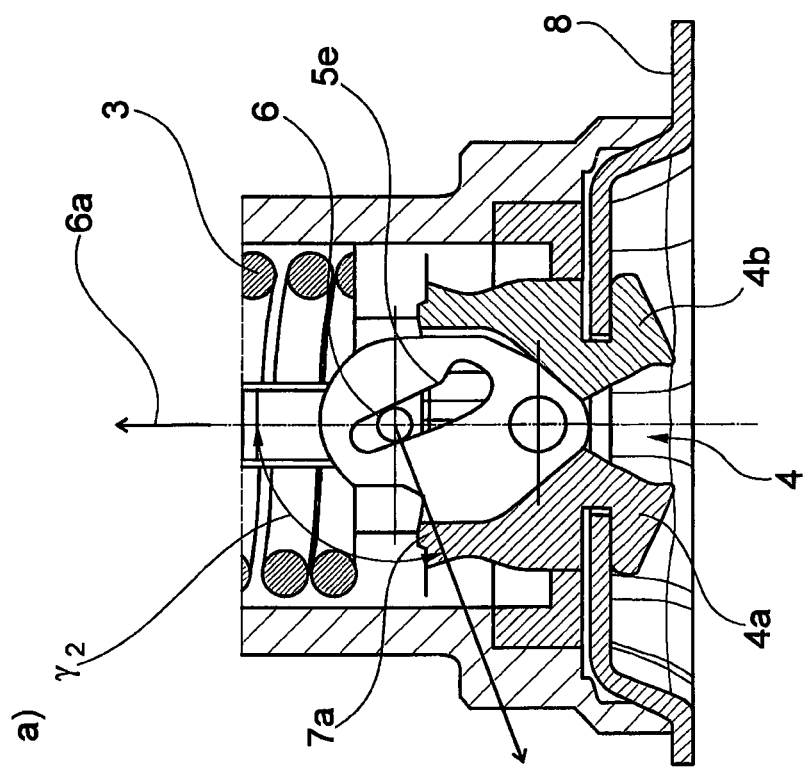

The FIG. 3 shows two detailed cross-sectional views of a section of the tool receiving device 1 shown in the FIG. 2, in a closed position (FIG. 3*a*) and in an open position (FIG. 3*b*). The moving element 6 moves due to the force action applied by the clamping device 3 in its movement direction 6*a*. The guide groove 5*e* is so designed that an angle $\gamma_2$ is included by a normal to the contact surface 7*a*, the guide recess 5*e* with the moving element 6, in the closed position (FIG. 3*a*), with the movement direction 6*a*. In the open position (FIG. 3*b*), an angle $\gamma_1$ is included by the normal on the contact surface 7*a*, the guide recess 5*e* with the moving member 6, with the movement direction 6*a*. The angle $\gamma_2$ is chosen so that it is close to 110 degrees (preferably in a range of 108 degrees to 112 degrees). Thus leads to force amplification with respect to the hook devices 4*a*/4 *b*, wherein the force amplification leads to a larger holding force of the holding device 4. The angle $\gamma_1$ is chosen such that it essentially corresponds to 180 degrees. Thus, the hook devices 4*a*/4*b* are held in the open position. From this open position (FIG. 3*b*), the holding device is only moved, when a torque on the hook devices 4*a*/4*b* via the actuating region 4*e*/4*f* is exerted by the tool device 8. The size of the angles $\gamma_1$ and $\gamma_2$ can, for a given movement direction of the moving element 6, be determined by the course of the guide recess 5*e*. By the shown choice of the angles $\gamma_1$ and $\gamma_2$, on the one hand, a secure retaining of the hook devices 4*a*/4*b* in the open position can be achieved, and on the other hand, a very high holding force can be achieved, which these hook devices 4*a*/4*b* exert on the tool device 8, and thus is a particularly reliable tool receiving device can be achieved.

Figure 4:
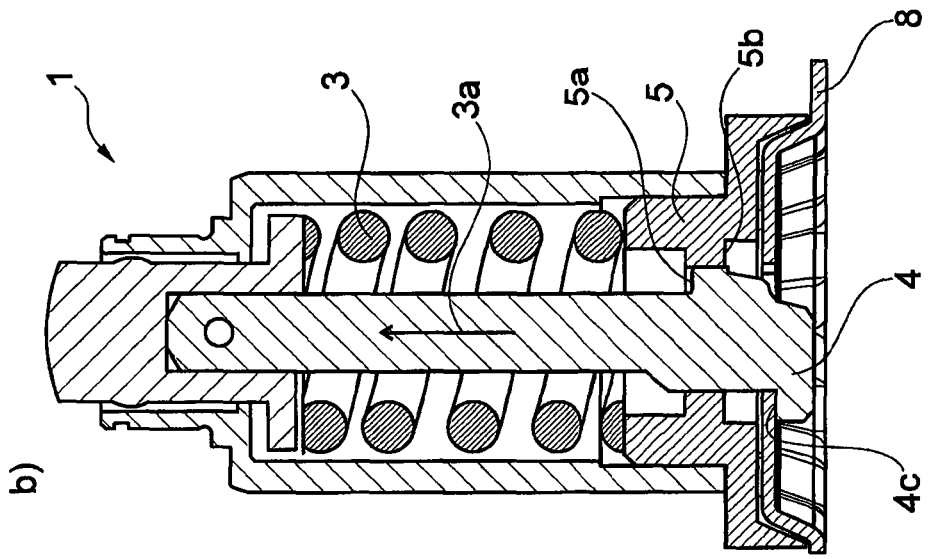
FIG. 4 shows two sectional views of a further embodiment of the tool receiving device, where
Figure 4:
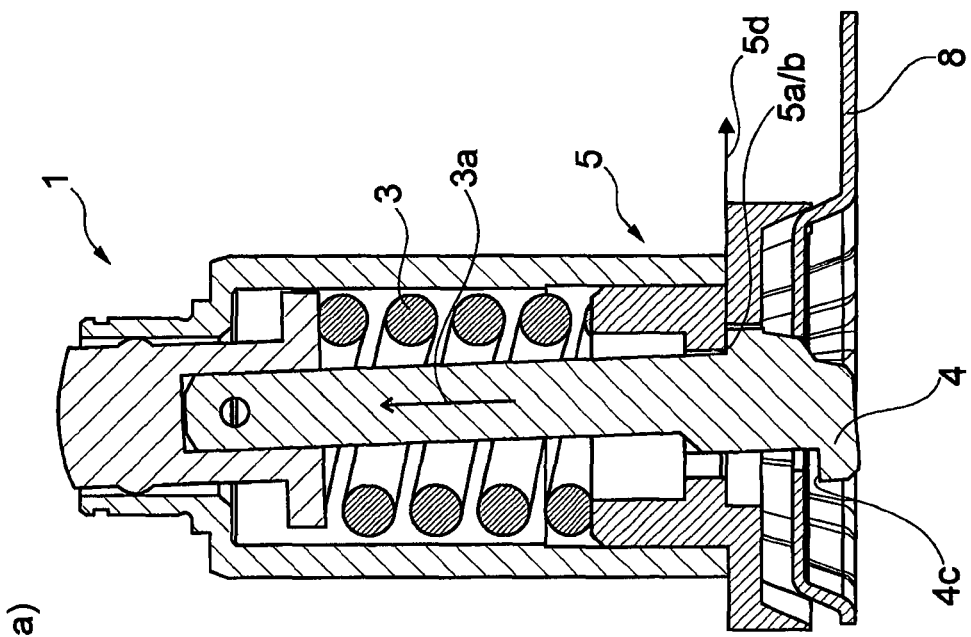
Figure 4C:
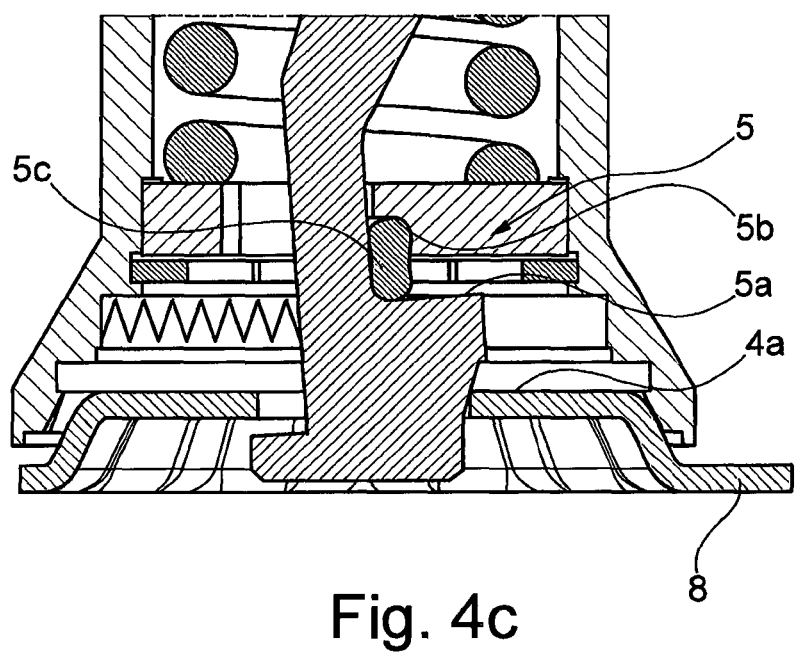
FIG. 4C shows a detailed view of the locking device.

The FIG. 4 shows a tool receiving device 1 in an open position and in a closed position, as well as a detailed view of the locking device. The tool receiving device 1 comprises a simple locking device 5, a clamping device 3 and a holding device 4. Here, the FIG. 4*a* shows the tool receiving device 1 in an open position, the FIG. 4*b* shows the tool receiving device 1 in a closed position, and the FIG. 4*c* shows a detailed view of a locking device with an indirect contacting with the locking surface section 5*a*/5*b*. The holding device 4 is acted upon by the clamping device 3 with the clamping force 3*a* and pulled toward the closed position. In the open position (FIG. 4*a*), the first blocking surface section 5*a* contacts the second locking surface section 5*b*. A locking force potential 5*d* results due to the clamping force 3*a* in conjunction with an effective coefficient of friction between these two sections 5*a*/5*b*. By means of the tool device 8, a force action against locking force potential 5*d* can be applied on the holding device. Only when the force action coming from the tool device 8 is greater than the locking force potential 5*d*, the holding device is moved toward the closed position (FIG. 4*b*). In the closed position (FIG. 4*b*), the tool device 8 is thereby held by the holding device 4 in the tool receiving device 1, that the clamping force 3*a* is transmitted to the holding surface 4*c* on the tool device 8. The FIG. 4*c* shows a locking device 5, in which the first locking surface section 5*a* and the second locking surface section 5*b* contact each other by means of an intermediate element 5*c*. For transferring the tool receiving device 1 from the open position, in which it is shown in the FIG. 4*c*, to the closed position a force action is applied by the tool device 8 in the actuating region 4*a*. When a threshold is exceeded, the holding device is moved toward the closed position (not shown).

Figure 5:
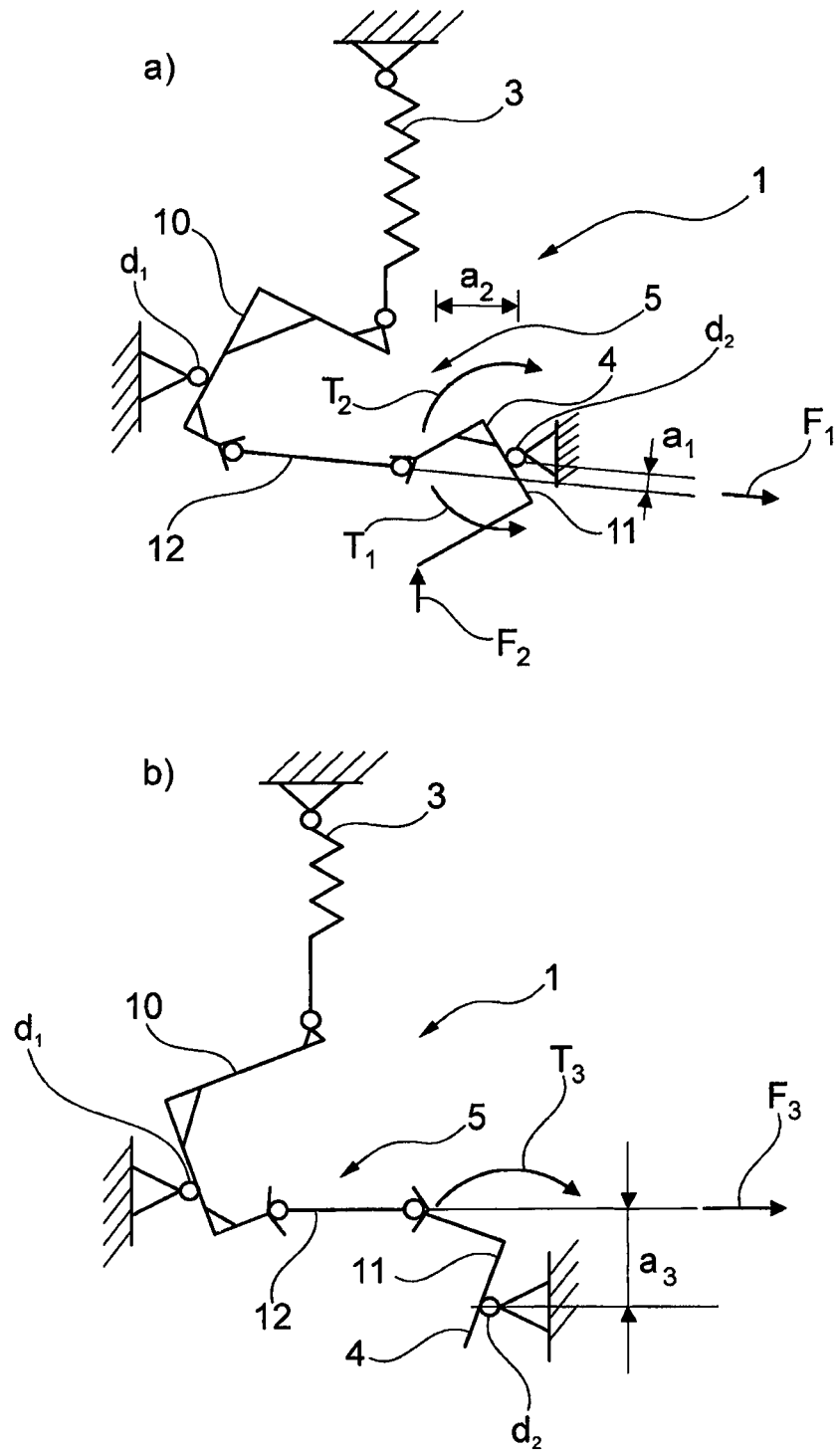
FIG. 5 shows two schematic representations of the tool receiving device.

The FIG. 5 shows two schematic representations of a tool receiving device in the closed position (FIG. 5*b*) and in the open position (FIG. 5*a*). The tool receiving device 1 comprises a clamping device 3, a holding device 4 and locking device 5. The locking device 5 has a first lever member 10, a second lever member 11 and a connection element 12. In this case, the first lever member 10 is in contact with the second lever member 11 by means of the connection element 12. The first lever member 10 is acted upon with a clamping force by means of the clamping device 3 in the closed position and it is rotatably mounted around a pivot point d1. The second lever member 11 is rotatably mounted around a second pivot point d2. In the open position (FIG. 5*a*), the first lever member 10 exerts a force action F1 to the second lever element 11 via the connection element 12. This force action is spaced by the distance a1 from the pivot point d2 and thus causes a torque T1 to the second lever member 11. When a tool (not shown) is inserted into the tool receiving device 1, a force action F2 by the tool device (not shown) is caused directly or indirectly to the second lever element 11. The force action F2 is spaced by the distance a2 from the pivot point d2 and causes a torque T2 on the second lever member 11. When the torque T2 exceeds the torque T1, then the second lever member 11 is moved in the direction of the torque T2, the tool receiving device closes. In the closed position (FIG. 5b), the first lever member 10 exerts a force action F3 on the second lever member 11 by means of the connection element 12. The force action F3 is spaced by the distance a3 from the pivot point d2 and causes a torque T3. In this closed position, the tool device (not shown) can be held in the tool receiving device by means of a holding device 4 (not shown). By the described configuration of the lever elements 10/11 and their connection to the connection element 12, the tool device can be held with a so-called over-center position, such mechanisms have been found to be especially safe, so that an improved tool receiving device 1 can be achieved.

Figure 6:
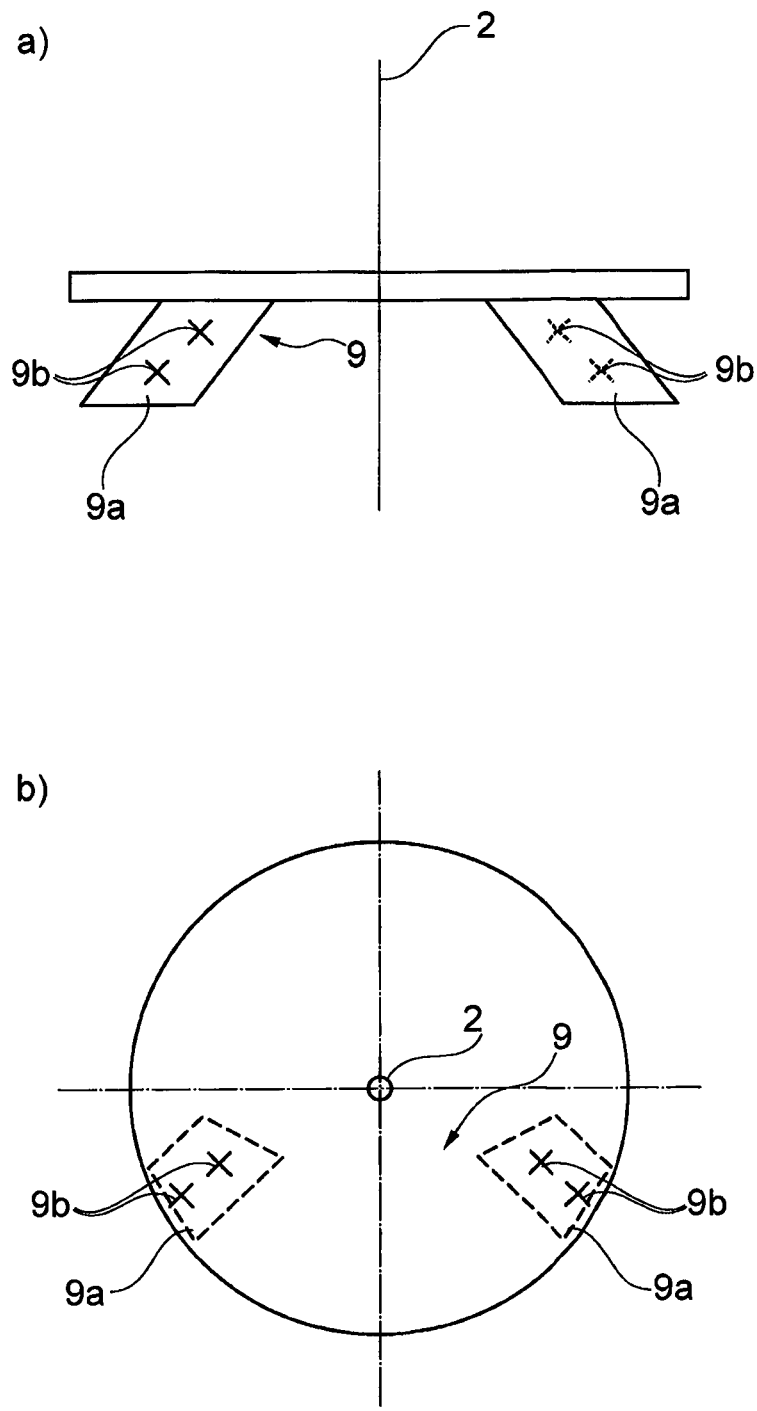
FIG. 6 shows a torque transmission area with two output surface areas

The FIG. 6 shows two views of a torque transmission region 9 of a tool receiving device (FIG. 6a front view, FIG. 6b top view). This torque transmission region 9 has two output area regions 9a which each have a plurality of surface points 9b. The torque transmission portion 9 is adapted to transfer the driving forces of the machine tool (not shown) onto a tool device (not shown). The machine tool drives the tool device in a rotating-oscillating manner, thereby the tool device oscillates around the driving axis 2.

Figure 7:
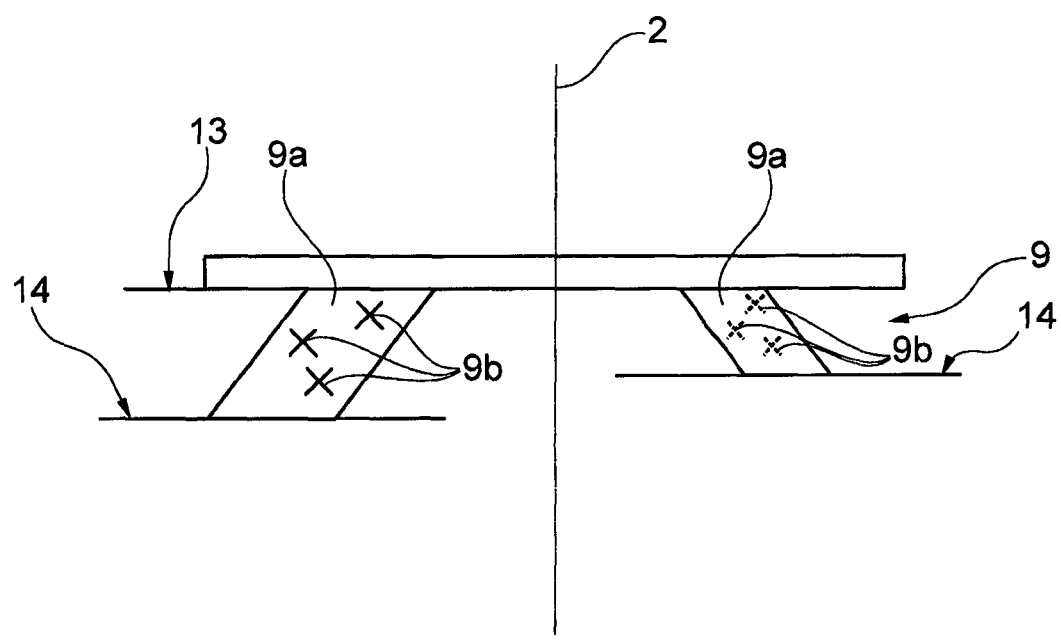
FIG. 7 shows a torque transmission region with output area regions, which extend between boundary planes.

The FIG. 7 shows a torque transmission region 9 of a machine tool, it is adapted to transmit the driving forces from the machine tool (not shown) onto the tool device (not shown). The torque transmission region 9 has two output area regions 9a. Each output area regions 9a has a plurality of surface points 9b. The area regions 9a each extend between an upper boundary plane 13 and a lower boundary plane 14, the upper boundary planes coincide in a boundary plane 13. The boundary planes 13/14 are arranged perpendicular to the driving axis 2. By means of the machine tool (not shown), the tool device (not shown) is rotationally driven to oscillate around the driving axis 2.

Figure 8:
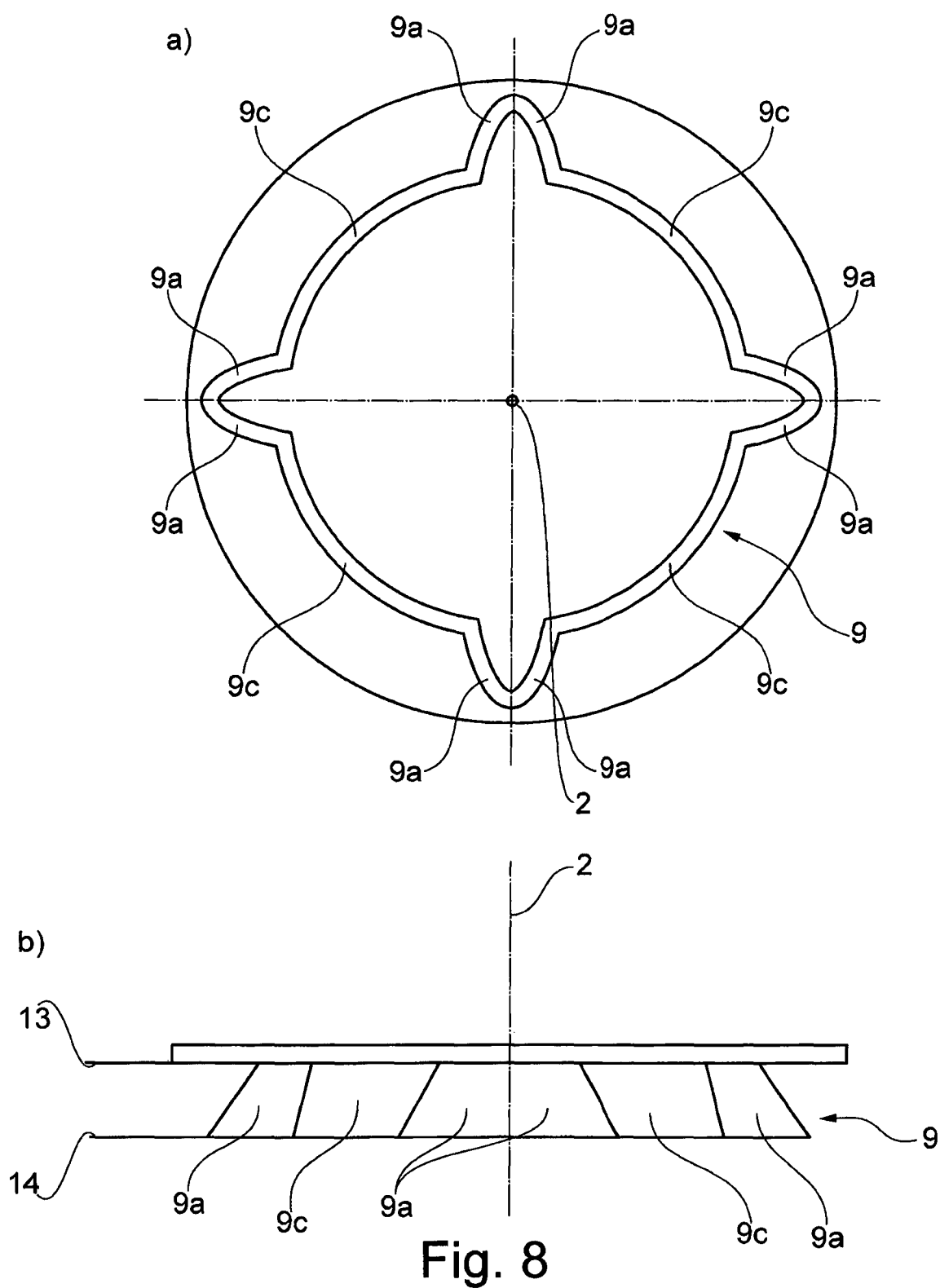
FIG. 8 shows a torque transmission region with two output area regions, which are arranged abutting each other.

The FIG. 8 shows two views of a torque transmission region 9 of a machine tool (FIG. 8a plan view, FIG. 8b front view). The torque transmission region 9 is provided to transfer the driving forces from a machine tool (not shown) onto a tool device (not shown), the tool device is driven rotationally oscillating around the driving axis 2. Each two output area regions 9a are positioned abutting one another, and several of these output area regions 9a are arranged rotationally symmetrical around the driving axis 2. The output area regions 9a extend between a single upper boundary plane 13 and a single lower boundary plane 14. Each two output area regions 9a are connected to two further output area regions 9a by means of a connection region 9c. By the abutting arrangement of the output area regions 9a, these can support each other, and a particularly stable torque transmission region 9 can be achieved. Due to the rotationally symmetric arrangement of the output surface areas 9a, it is possible to offset the tool device in discrete steps around the driving axis, thus a more flexible use of the machine tool (not shown) is provided.

Figure 9:
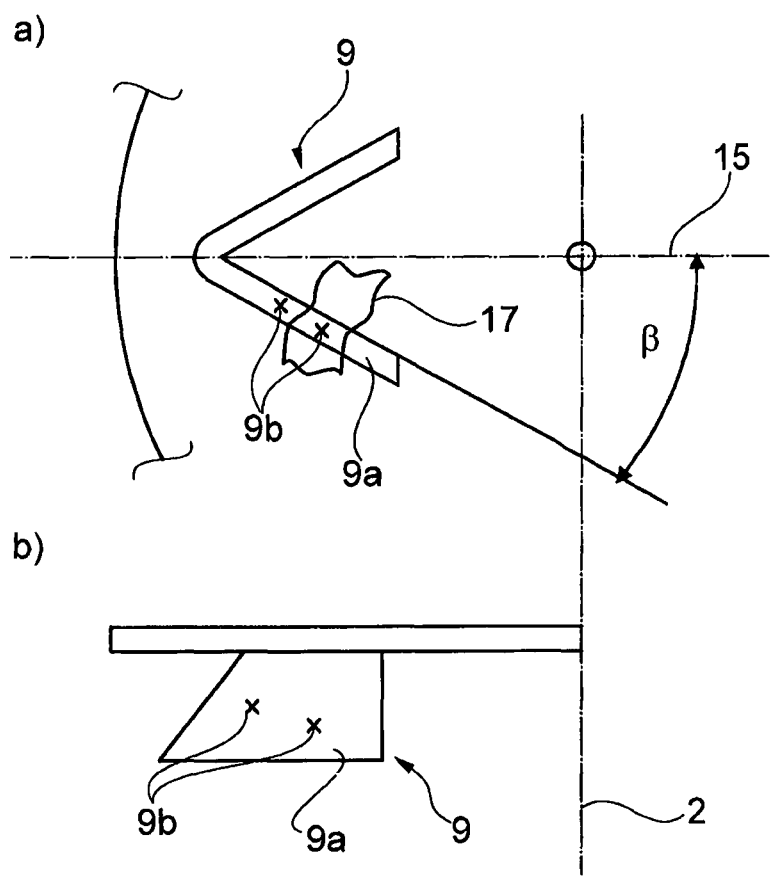
FIG. 9 shows a torque transmission region and the inclination of essentially the output area regions (tangent plane) by the angle ß.

The FIG. 9 shows two views of a section of a torque transmission region 9 of the machine tool shown (FIG. 9a plan view, FIG. 9b front view). An axial plane 15 includes the driving axis 2. A tangent plane 17 is tangent to the output area region 9a in a surface point 9b. The tangential plane 17 includes the acute angle ß with the axial plane 15.

Figure 10:
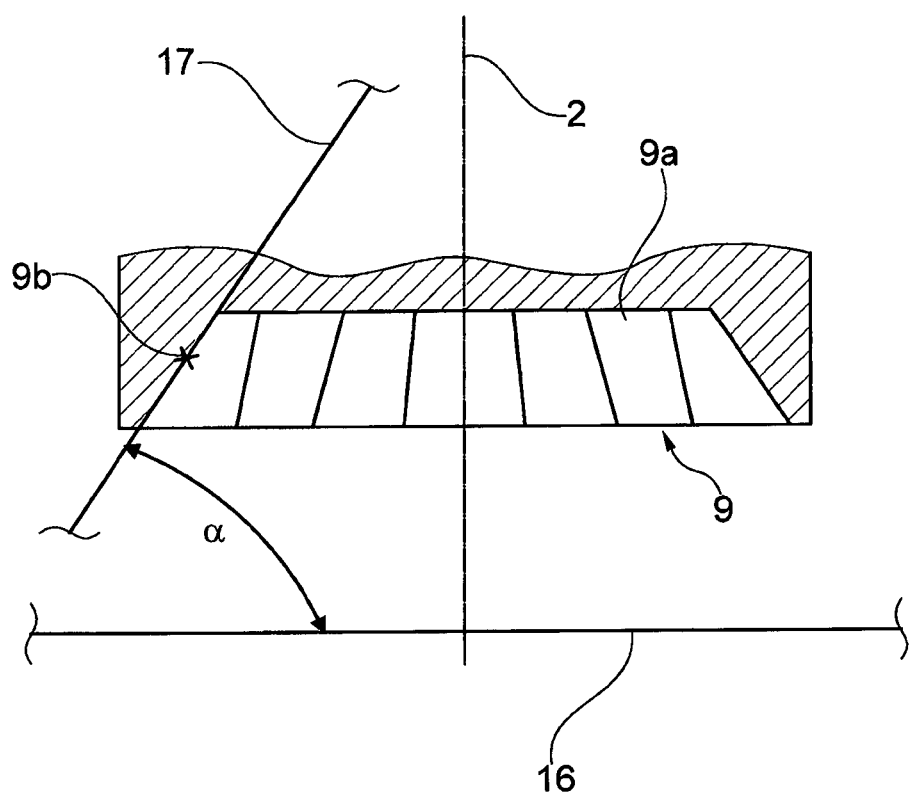

The FIG. 10 shows a sectional view of a torque transmission region 9 of a machine tool. The torque transmission region 9 has a plurality of output area regions 9a. A tangent plane 17 is tangent to one of these output area regions 9a in a surface point 9b. A radial plane 16 is arranged orthogonal to the driving axis 2. The radial plane 16 includes an acute angle α with the tangent plane 17.

The FIG. 11 shows a tool receiving device 1 in three-dimensional illustration. The torque transmission region 9 has a plurality of output area regions 9a. The output area regions are rotationally symmetrically arranged in a star-shaped manner around the driving axis 2. A tool device (not shown) can be held on the machine tool by the hook devices 4a/4b. The output area regions 9a are positioned so that a normal 18 to one of these output area regions 9a has its direction to the driving axis of rotation 2. It follows that the torque transmission region 9 is designed essentially as a recess with a star-shaped profile. The output area regions 9a are arranged contiguously and extend closed around the driving axis of rotation 2. By this arrangement, a particularly stable torque transmission region 9 can be achieved, which allows a uniform introduction of the driving forces from the machine tool (not shown) onto the tool device (not shown).

Figure 12:
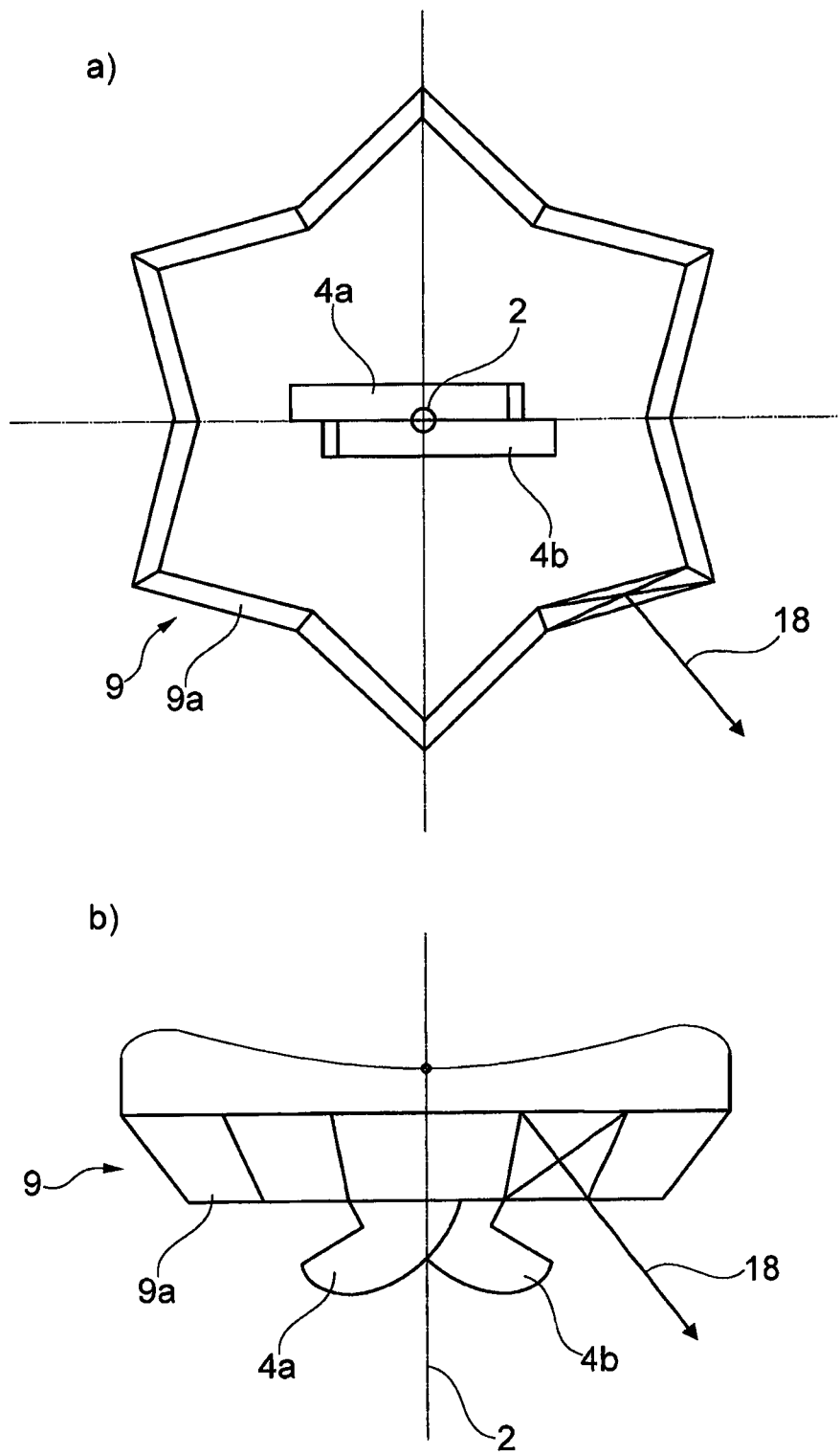

The FIG. 12 shows a torque transmission region 9 of a tool receiving device of a hand guided machine tool, wherein in the FIG. 12a a plan view of the tool receiving device is shown, and wherein in the FIG. 12b a front view of the tool receiving device is shown. A tool device (not shown) can be held at a torque transmission region 9 by means of the hook devices 4a/4b. For this purpose, the hook devices 4a/4b can be moved in opposite directions and can be actuated by the tool device. The torque transmission region 9 has a plurality of output area regions 9a, which are star-shaped and arranged radially circumferentially closed around the driving axis 2. A normal 18 to one of these output area regions 9a is oriented away from the driving axis 2. By such an arrangement of the output area regions 9a, a particularly simple tool receiving device can be achieved.

The FIG. 13 shows two partial sectional views of the torque transmission regions 9 of a tool receiving device of a hand guided machine tool. In this case, different encoding devices 19 are shown in the FIG. 13. The FIG. 3a shows a torque transmission region 9 with a variety of output area regions 9a. The output area regions 9a are arranged in a star-shaped manner around the driving axis 2, and they are radially spaced therefrom. In the region of the driving axis 2, an encoding device 19a is arranged as a raised section, while this encoding device 19a is adapted to engage into a recess in the tool device (not shown). The encoding device 19a is arranged circular and rotationally symmetrical to the driving axis 2. The FIG. 13b shows a torque transmission region 9 with a variety of output area regions 9a. The output area regions 9a are arranged in a star-shaped manner around the driving axis 2, and they are radially spaced therefrom. In the region of the driving axis 2, an encoding device 19b is arranged as a recess, while this encoding device 19b is adapted that a raised portion of a tool device (not shown) engages into it.

The FIG. 14 shows a machine tool system comprising a tool receiving device 1 and a tool device 8. The tool device 8 is received on the tool receiving device 1 in such a way that the driving axis of rotation 2 and the tool device axis of rotation 8b coincide. The tool tool 8 comprises a tool attachment region 8a, this extends between a first orthogonal plane 8c and a second orthogonal plane 8d. The tool driving area region 8f is disposed between the first orthogonal plane 8c and the second orthogonal plane 8d. The first orthogonal plane 8c limits the tool attachment region 8a on the machine tool side facing in the direction of the tool axis of rotation 8b, the second orthogonal plane 8d limits the tool attachment region 8a on the side facing away from the machine tool side. The tool driving area region 8f is provided for the transmitting of the driving forces from the machine tool onto the tool device 8. For this purpose, the tool driving area region 8f has at least in sections the negative form of the output area region 9a, and allows therefore a form fit connection between the tool device 8 and the tool receiving device 1. The tool device 8 has a tool encoding device 8e, through which the first hook device 4a and the second hook device 4b of the holding device 4 grip. The hook devices 4a/4b exert a holding force effect 4h in the region of the actuating surface 4c on the tool device 8. The tool device 8 is held on the machine tool by the holding force effects 4h. By the double inclination around the angle α and angle ß (not shown) of the output area regions 9a of the torque transmission region 9, the tool device 8 is held free from backlash in the tool receiving device 1. The holding force effects 4h are indirectly applied by the clamping device 3. The hook devices 4a/4b of the holding device 4 are mounted rotatably around the hook pivot point 4d. The clamping device 3 contacts the holding device 4 by the moving element 6. By the described configuration of the guide recess 5e, the sum of the holding force effects 4h is amplified in regard to the clamping force 3a, and a particularly secure holding of the tool device 8 in the tool receiving device 1 can be achieved.

The FIG. 15 shows the path of the tool side wall 8i, which has the tool driving area region 8f. The tool driving area region 8f are arranged in a star-shaped manner around the tool axis of rotation 8b, and they are partly conjugated to the output area regions of the torque transmission region (not shown). The tool side wall 8i runs in the region of the tool driving area regions 8f between a first distance r1 and second distance r2 to the tool axis of rotation 8b. The tool driving area regions 8f have turn tool surface points 8h. Due the course of the tool driving area regions 8f, which are adapted to the output area regions of the torque transmission region (not shown), a form fit transmission of the driving forces from the machine tool onto the tool device 8 has been enabled, thus, very large driving forces can be securely transmitted.

The FIG. 16 shows various contact regions 20a, 20b, 20c between the tool driving area regions 8f and the output area regions 9a of the torque transmission region 9. Here, the form and nature of these contact regions 20a, 20b, 20c depend on the shape of the two output area regions 8f/9a and their interaction. The FIG. 16a shows a point shaped contact area 20a. In this case, the contact region 20a has a circular extension or an elliptical extension. A point shaped contact area 20a is particularly insensitive to an inaccurate positioning of the tool device in regard to the machine tool, as this can be caused by tolerances in the manufacture of the tool device. The FIG. 16b shows the line shaped contact region 20b. In this case, the contact region 20b has along the contact line 21 a large extension and transverse to it a small extension. Compared to a point shaped contact region 20a, a line shaped contact region 20b has a larger contact area and it can transfer larger driving forces of the machine tool onto the tool device. The FIG. 16c shows an area shaped contact region 20c. In this case, the area shaped contact region 20c has a larger contact area compared to the line shaped contact region 20b, and it can therefore transfer larger driving forces from the machine tool to the tool device. Compared to the point shaped contact region 20a, the line shaped contact region 20b and the area shaped contact region 20c require a higher accuracy, both in the production of the output area region 8f/driving area region 9a as well as the positioning of the tool device on the machine tool. The output area region 9a and the tool drive area region 8f can thus be coordinated, that an area shaped contact (FIG. 11c) or line shaped contact (FIG. 11b) is set upon the transmission of appreciable driving forces, for example during the operation of the machine tool with rated power.

The FIG. 17 shows different sections of an output area region 9a. Not shown is an area shaped output surface region, which is also possible. The FIG. 17a shows a unidirectionally curved section of an output area region 9a. This section of the output area region 9a can be described by means of straight lines a and curved grid lines $b_I$. The curved grid lines $b_I$ have a constant radius of curvature $R_I$. Such an output area region 9a corresponds in sections to a cylinder jacket surface. As far as several different radii of the curvature $R_I$ are provided, it corresponds to a conical surface (not shown). In this case, the size of the radius of curvature $R_I$ has be chosen such that the driven surface portion 9a change in sections to a plane or to the counter surface (not shown) in the transmission of driving forces, or that the tool driving area region 8f adjusts in the transmission of driving forces, cooperating with these for transmitting the driving forces. The FIG. 17b shows a section of one output area region 9a with a bidirectional curvature. This section of the output surface area 9a can be described by curved grid lines $b_I$ and by curved grid lines $b_{II}$. The curved grid lines $b_I$ have a constant radius of curvature $R_I$ and the grid lines $b_{II}$ have a constant radius of curvature $R_{II}$. Such an output area 9a corresponds, for the special case that the first radius $R_I$ and the second radius $R_{II}$ of curvature are the same size, to a spherical surface. The FIG. 17b shows an output area 9a with different radii of curvature $R_I$ and $R_{II}$. In this case, the size of the radii of curvature $R_I$ and $R_{II}$ are such that the output area region 9a is at least partially changed during the transmission of the driving forces to a plane or to the tool driving area region 8f (not shown) with which it adapts cooperating for transmitting the driving forces. The FIG. 17c shows a section of one output area region 9a with a bidirectional curvature. This section of the output area region 9a can be described by the grid lines $b_I$ with a constant radius of curvature $R_I$ and by the grid lines with a variable radius of curvature $R_{Ia}$. In such an output area region 9a, also all grid lines can have a variable radius of curvature (not shown). The size of the radii of curvature $R_I$ and $R_{II}$ can be selected so that the output area region 9a can be altered during the transmission of the driving forces in sections to a plane or to the tool drive area 8f (not shown) with which it adapts to cooperate with these for transmitting the driving forces. In the FIG. 17, the curved output area region 9a is shown as concave. The considerations expressed can be transferred to convex curved input/output area regions, correspondingly. Advantageously, a concave-convex pairing of the driving area region 8f/output area region 9a is chosen, because so large driving forces can be transmitted, or a mating convex-convex is chosen, because so a simple positioning of the tool device is made possible.

The FIG. 18 shows a tool device 8, which is received in a machine tool 22. The tool device 8 has a tool attachment region 8a, by which it is connected to the machine tool 22. The machine tool 22 has an output spindle 22a, which guides the driving forces to the tool device 8, and in particular a tool attachment region 8a. The output drive spindle 22a moves around the drive shaft 2, in particular rotationally oscillating, thereby also the tool device 8 is set in a similar motion. The tool device 8 has an operating region 8j, which is set up to act on a work piece or work piece arrangement (not shown). The driving forces of the machine tool 22 is transferred from the tool attachment region 8a on the operating region 8j using the tool connection region 8k. The machine tool 22 has an operating lever 22b, which is adapted to permit a change of the tool device 8.

LIST OF REFERENCE SIGNS 1 tool receiving device of a hand guided machine tool
2 driving axis
3 clamping device
3a clamping force
4 holding device
4a first hook device
4b second hook device
4c holding surface
4d hook pivot point
4e actuating surface of 4a
4f actuating surface of 4b
4g holding device boundary surface
4h holding force effect
5 locking device
5a first locking surface section
5b second locking surface section
5c intermediate element
5d locking force potential
5e guide recess
6 moving element
6a current movement direction of 6
7 contact surface
7a normal to the contact surface
8 tool device
8a tool attachment region
8b tool axis of rotation
8c first orthogonal plane
8d second orthogonal plane
8e tool encoding device
8f tool driving area region
8g axial extension of the tool driving area region
8h tool surface point
8i tool side wall
8j operating region
8k tool connection region
9 torque transmission region
9a output area region
9b surface point
9c connection region
9d fastening screw
9e washer
9f nut member
9g tie bar device
10 first lever member
11 second lever member
12 connection element
13 upper boundary plane
14 lower boundary plane
15 axial plane
16 radial plane
17 tangent plane
18 normal to an output area region
19 coding device
19a raised encoding device
19b encoding device with recess
20a point shaped contact region
20b line shaped contact region
20c area shaped contact region
21c contact line
22 machine tool
22a output spindle
22b operating lever
$\gamma_1$ angle
$\gamma_2$ angle
T1 first torque on the second lever member
T2 second torque on the second lever member
T3 third torque on the second lever member
d1 pivot point of the first lever member
d2 pivot point of the second lever member
F1 first force action on the second lever member
F2 second force action on the second lever member
F3 third force on the second lever member
a1 distance between d2 and F1
a2 distance between d2 and F2
a3 distance between d2 and F3
r_1 first distance of the tool side wall to the tool axis of rotation
r_2 second distance of the tool side wall to the tool axis of rotation
$R_I$ first radius of curvature of an output area region
$R_{Ia}$ variable radius of curvature of a output area region
$R_{II}$ second radius of curvature of an output area region
a straight extending grid line of an output surface area
$b_I$ first curved grid line of an output area region
$b_{II}$ second curved grid line of an output area region
$b_{Ia}$ third grid line with variable a curvature of an output area region
α angle
ß angle

What is claimed is:

1. A machine tool, which has a tool receiving device moving around a driving axis,
    wherein the tool receiving device is adapted to hold a tool device on the machine tool such that the driving axis and a tool axis of rotation are substantially coincident,
    wherein the tool receiving device has at least one clamping device, at least one holding device and at least one locking device,
    wherein the holding device can be moved from a first open position into a second closed position, wherein a clamping force can be applied onto the holding device by the clamping device, wherein when the holding device is in the second closed position the holding device extends at least partly into or through the tool device,
    wherein the locking device can be moved between a first locking position and a second unlocking position, wherein the locking device is adapted to cooperate with the holding device, wherein a movement of the holding device can be blocked in the first open position by the locking device when the locking device is in the first locking position, and
    wherein the locking device is designed such that the locking device can be moved from the first locking position into the second unlocking position by a force, which has been applied by the tool device on the holding device, which acts on the locking device.

2. The machine tool according to claim 1, wherein the clamping device has at least one spring device and that the spring device is selected from a group of devices comprising at least:
    a gas or oil pressure spring device,
    a sheet or diaphragm spring device, a spiral spring device,
a coil spring,
a torsion spring,
a torsion bar spring,
an elastomeric spring device,
a magnetic and electromagnetic spring device, and
a combination of several of the devices.

3. The machine tool according to claim 1, wherein the holding device is rotatably mounted in at least one direction of rotation and/or that at least in one direction the holding device is translatory mounted.

4. The machine tool according to claim 1, wherein the machine tool comprises two of the holding devices.

5. The machine tool according to claim 4, wherein each of the two holding devices are movable in substantially opposite directions.

6. The machine tool according to claim 1, wherein
a locking force action can be applied from the locking device on the clamping device in the locking position,
a unlocking force action can be applied from the tool device on the locking device, and
the unlocking force action is opposite to the locking force action.

7. The machine tool according to claim 6, wherein
the locking device comprises a first locking surface section and a second locking surface section,
the first locking surface section contacts directly or indirectly the second locking surface section, and
at least one component of the clamping force is directed substantially parallel to at least a normal to the first locking surface section or to the second locking surface section.

8. The machine tool according to claim 7, wherein the first locking surface section is mounted in regard to the second locking surface section in the locking position and is mounted with sliding bearings.

9. The machine tool according to claim 1, wherein
the clamping device comprises a moving element,
the moving element can be moved along a first direction of movement,
the locking device has a contact surface, and
the contact surface is adapted to be contacted by the moving element.

10. The machine tool according to claim 9, wherein
when the locking device is substantially in the first locking position, a normal to the contact surface in a contact point with the moving element includes an angle γ1 with the first direction of movement of the moving element, and
the angle γ1 is larger than 80 degrees and
smaller than or equal to 315 degrees.

11. The machine tool according to claim 9,
when the locking device is substantially in the second unlocking position, a normal to the contact surface in a contact point with the moving element includes an angle γ2 with the first direction of movement of the moving element, and
the angle γ2 is smaller than or equal to 180 degrees and larger than 95 degrees.

12. The machine tool according to claim 1, wherein
a connection device of the machine tool comprises a torque transmission section, the torque transmission section comprises at least two output area region each having a plurality of surface points for transmitting a driving force to the tool device, wherein the torque transmission section is spaced apart to the driving axis, tangent planes on the surface points are inclined in regard to an axial plane, which includes the driving axis, and these tangent planes are inclined in regard to a radial plane, which extends perpendicular to the driving axis.

13. The machine tool according to claim 12, wherein at least one of the at least two output area regions are at least in sections substantially planar.

14. The machine tool according to claim 13, wherein at least one of the at least two output area regions are at least partially curved.

15. The machine tool according to claim 12, wherein
the torque transmission area has at least one first upper boundary plane and at least one second lower boundary plane,
the at least one first upper boundary plane and the at least one second lower boundary plane are substantially perpendicular to the driving axis,
the at least one first upper boundary plane and the at least one second lower boundary plane are spaced apart from each other, and
each of the at least two output area regions is disposed between one of the at least one first upper boundary plane and one of the at least one second lower boundary plane.

16. The machine tool according to claim 15, wherein a plurality of the at least two output area regions extend between one single first upper boundary plane and one single second lower boundary plane.

17. The machine tool according to claim 12, wherein the torque transmission region has a plurality of output area regions which are arranged rotationally symmetrical around the driving axis.

18. The machine tool according to claim 12, wherein
at least two of the at least two output area regions are arranged symmetrically to a plane of symmetry,
the driving axis is located in the plane of symmetry, and
the output area regions are arranged substantially contiguously.

19. The machine tool according to claim 12, wherein
the torque transmission region comprises a side wall,
the side wall extends spaced radially from the driving axis, and
the side wall comprises the at least two output area regions.

20. The machine tool according to claim 19, wherein the side wall extends substantially radially closed around the driving axis.

21. The machine tool according to claim 12, wherein a normal to one of the tangent planes is oriented in the radial direction away from the driving axis.

22. The machine tool according to claim 12, wherein a normal to one of the tangent planes is oriented in the radial direction towards the driving axis.

23. The machine tool according to claim 12, wherein
the angle α is enclosed between one of the tangent planes and the radial plane, wherein the radial plane is arranged vertically to the driving axis,
the angle α is smaller than 90 degrees, and
the angle α is larger than 0 degree.

24. The machine tool according to claim 12,
angle ß is enclosed between one of the tangent planes and the axial plane,
wherein the driving axis is located in the axial plane,
the angle ß is smaller than 90 degrees, and the angle ß larger than 0 degree.

25. The machine tool according to claim 12, wherein the torque transmission region has an even number of output area regions.

26. The machine tool according to claim 12, wherein the at least two output area regions are arranged in a star-shaped manner.

27. The machine tool according to claim 1, wherein
the machine tool has an encoding section,
the encoding section comprises at least a first cross-sectional area, and
the encoding section has a first dimension essentially in a direction perpendicular to the cross-sectional area.

28. The machine tool according to claim 27, wherein the encoding sections is arranged rotationally symmetrically with respect to the driving axis.

29. The machine tool according to claim 27, wherein the shape of a base area of the encoding section is selected from a group of shapes comprising at least:
a polygon having a plurality of corners,
a circle, and
an ellipse.

30. A machine tool system with a machine tool according to claim 1 and at least a tool device for use with the machine tool,
wherein the holding device comprises at least an effective area for transmitting a force action on the tool device, and wherein it is limited by a holding device boundary surface in the direction of the driving axis on the far side from the machine tool,
wherein the tool device comprises a tool attachment region and a tool axis of rotation, wherein the tool attachment region has at least one side wall and extends in the axial direction between a first orthogonal plane and a second orthogonal plane, wherein the first and second orthogonal planes are arranged perpendicular to the tool axis of rotation, wherein the side wall is spaced apart radially from the tool axis of rotation and has an axial dimension in the direction of the tool axis of rotation, wherein
the holding device on the tool device exerts a force action in a region of the effective area, and
the force action has at least one component in the direction of the tool axis of rotation.

31. The machine tool system according to claim 30, wherein the holding device boundary surface and the effective area of the holding device are arranged between the first and second orthogonal planes of the tool attachment region, when the tool device is mounted on the machine tool.

32. The machine tool system according to claim 30, wherein
the side wall of the tool device comprises tool driving area regions and extends in the radial direction at least in a section between a first radial distance and a second radial distance from said tool axis of rotation, and
at least one of the tool driving area regions is configured to transmit the torque from the machine tool onto the tool device.

33. A machine tool, which has a tool receiving device moving around a driving axis,
wherein the tool receiving device is adapted to hold a tool device on the machine tool such that the driving axis and a tool axis of rotation are substantially coincident,
wherein the tool receiving device has at least one clamping device, at least one holding device and at least one locking device,
wherein the holding device can be moved from a first open position into a second closed position, wherein a clamping force can be applied onto the holding device by the clamping device, wherein when the holding device is in the second closed position the holding device extends at least partly into or through the tool device,
wherein the locking device can be moved between a first locking position and a second unlocking position, wherein the locking device is adapted to cooperate with the holding device, wherein a movement of the holding device can be blocked in the first open position by the locking device when the locking device is in the first locking position, and
wherein the locking device is designed such that the locking device can be moved from the first locking position into the second unlocking position by a force, which has been applied, by the tool device, on the locking device via the holding device.

* * * * *